US012568481B2

(12) United States Patent
Mozaffari et al.

(10) Patent No.: US 12,568,481 B2
(45) Date of Patent: Mar. 3, 2026

(54) APPLICABILITY OF LTE-M SUBCARRIER PUNCTURING IN COEXISTENCE WITH NR

(71) Applicant: TELEFONAKTIEBOLAGET LM ERICSSON (PUBL), Stockholm (SE)

(72) Inventors: Mohammad Mozaffari, Fremont, CA (US); Johan Bergman, Stockholm (SE); Anders Wallén, Ystad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 802 days.

(21) Appl. No.: 17/635,652

(22) PCT Filed: Aug. 14, 2020

(86) PCT No.: PCT/IB2020/057697
§ 371 (c)(1),
(2) Date: Feb. 15, 2022

(87) PCT Pub. No.: WO2021/028885
PCT Pub. Date: Feb. 18, 2021

(65) Prior Publication Data
US 2022/0312430 A1     Sep. 29, 2022

Related U.S. Application Data

(60) Provisional application No. 62/887,616, filed on Aug. 15, 2019.

(51) Int. Cl.
H04W 72/12       (2023.01)
H04J 11/00        (2006.01)
(Continued)

(52) U.S. Cl.
CPC ............................... H04W 72/1215 (2013.01)

(58) Field of Classification Search
CPC .................................................. H04W 72/1215
(Continued)

(56) References Cited

U.S. PATENT DOCUMENTS

2005/0135492 A1*   6/2005   Jia .......................... H04L 1/0045
                                                                375/260
2007/0223419 A1*   9/2007   Ji ........................... H04W 16/14
                                                                370/329
(Continued)

FOREIGN PATENT DOCUMENTS

CA          2730717 A1      2/2010
CN          102687456 A     9/2012
(Continued)

OTHER PUBLICATIONS

Ericsson R1-1905959 ("Coexistence of LTE-MTC with NR", May 13-17, 2019) (Year: 2019).*
(Continued)

*Primary Examiner* — Xuan Lu

(57) ABSTRACT
In one aspect, a network device transmits using a first carrier having a predetermined number of subcarriers within the bandwidth of a second carrier, such that data for one or more of the predetermined number of subcarriers corresponding to a partial overlap by the first carrier of a resource block of the second carrier is not transmitted. In another aspect, the wireless device receives using a first carrier having a predetermined number of subcarriers within the bandwidth of a second carrier, such that one or more of the predetermined number of subcarriers corresponding to a partial overlap by the first carrier of a resource block of the second carrier are discarded when decoding the received signal.

23 Claims, 16 Drawing Sheets

(51) Int. Cl.
    *H04L 5/00*       (2006.01)
    *H04L 25/03*     (2006.01)
    *H04L 27/26*     (2006.01)

(58) Field of Classification Search
    USPC ........................................................ 370/329
    See application file for complete search history.

(56) References Cited

U.S. PATENT DOCUMENTS

| | | | |
|---|---|---|---|
| 2016/0072614 A1 | 3/2016 | Blankenship et al. | |
| 2018/0124744 A1* | 5/2018 | Xue | H04W 72/30 |
| 2018/0205581 A1* | 7/2018 | Kim | H04L 5/005 |
| 2019/0182899 A1* | 6/2019 | Ye | H04W 4/80 |
| 2019/0229840 A1* | 7/2019 | Takeda | H04L 5/0094 |
| 2021/0076409 A1* | 3/2021 | Goto | H04W 72/1268 |
| 2021/0281371 A1* | 9/2021 | Wei | H04L 5/0012 |
| 2021/0307042 A1* | 9/2021 | Shin | H04L 27/2602 |
| 2021/0345368 A1* | 11/2021 | Fang | H04W 72/0446 |

FOREIGN PATENT DOCUMENTS

| | | | | | |
|---|---|---|---|---|---|
| CN | 104041123 | A | | 9/2014 | |
| CN | 105577337 | A | * | 5/2016 | H04L 27/26 |
| CN | 106171024 | A | | 11/2016 | |
| CN | 108604971 | A | | 9/2018 | |
| CN | 107046721 | A | | 3/2020 | |
| KR | 1020150048738 | A | | 5/2015 | |
| KR | 1020180137415 | A | | 12/2018 | |
| WO | 2018012550 | A1 | | 1/2018 | |
| WO | 2018172403 | A1 | | 9/2018 | |

OTHER PUBLICATIONS

Ericsson, "Coexistence of LTE-MTC with NR", 3GPP TSG RAN WG1 Meeting #97, R1-1905959, Reno, Nevada, USA, May 13-17, 2019.

Ericsson, "Feature lead summary for Coexistence of LTE-MTC With NR", 3GPP TSG RAN WG1 Meeting #97, R1-1907581, Reno, USA, May 13-17, 2019.

Ericsson, "Revised WID: Additional MTC enhancements for LTE", 3GPP TSG RAN Meeting #84, RP-191356, Newport Beach, USA, Jun. 3-6, 2019.

ETSI 3GPP TS 38.104, V15.3.0, "5G; NR; Base Station (BS) radio transmission and reception", Oct. 2018 (3GPP TS 38.104 version 15.3.0 Release 15).

Huawei et al., "Feasible placement for LTE-M coexistence with NR", 3GPP TSG-RAN WG4 Meeting #90bis, R4-1903846, Xi'an, China Apr. 8-12, 2019.

* cited by examiner

LTE-M PRBs
- LTE-M REs which can be punctured
- Can be configured via RRC signaling
- Dynamically controlled by DCI
- Enabled: corresponding PRB is allocated to NR
- Disabled: no puncturing, corresponding PRB is allocated to LTE-M
*FIG. 8*

900

TRANSMIT USING A FIRST CARRIER HAVING A PREDETERMINED NUMBER OF SUBCARRIERS WITHIN THE BANDWIDTH OF A SECOND CARRIER, SUCH THAT DATA FOR ONE OR MORE OF THE PREDETERMINED NUMBER OF SUBCARRIERS CORRESPONDING TO A PARTIAL OVERLAP BY THE FIRST CARRIER OF A RESOURCE BLOCK OF THE SECOND CARRIER IS NOT TRANSMITTED
902

RECEIVE USING A FIRST CARRIER HAVING A PREDETERMINED NUMBER OF SUBCARRIERS WITHIN THE BANDWIDTH OF A SECOND CARRIER, SUCH THAT ONE OR MORE OF THE PREDETERMINED NUMBER OF SUBCARRIERS CORRESPONDING TO A PARTIAL OVERLAP BY THE FIRST CARRIER OF A RESOURCE BLOCK OF THE SECOND CARRIER ARE DISCARDED WHEN DECODING THE RECEIVED SIGNAL
904

*FIG. 9B*

APPLICABILITY OF LTE-M SUBCARRIER PUNCTURING IN COEXISTENCE WITH NR

RELATED APPLICATIONS

This application is a national stage application of International Patent Application No. PCT/IB2020/057697, filed Aug. 14, 2020, which claims the benefit of U.S. Provisional Pat. App. No. 62/887,616, filed Aug. 15, 2019, the disclosures of which are hereby incorporated herein by reference in their entirety.

TECHNICAL FIELD

The present disclosure generally relates to the field of wireless network communications, and more particularly, to deploying LTE-M in coexistence with New Radio (NR).

BACKGROUND

Machine-type communications (MTC) are widely used in many applications such as vehicle tracking, user and home security, banking, remote monitoring and smart grids. According to some reports, by 2023 there will be 3.5 billion wide-area devices connected to cellular networks. To support these devices, members of the $3^{rd}$-Generation Partnership Project (3GPP) have standardized radio access technology specifically intended to support low-bandwidth, low-energy devices. This technology, which is based on the $4^{th}$-generation technology known as Long-Term Evolution (LTE), is referred to as LTE-M. Network support for LTE-M (also referred to as LTE-MTC or eMTC) is being rolled out at a fast pace, and it is foreseen that in the next few years, a massive number of devices will be connected to the networks, addressing a wide spectrum of LTE-M use cases.

Thanks to a design that enables 10-year battery lifetime of LTE-M devices, many of these devices will remain in service years after deployment. During the lifetime of these deployed LTE-M devices, many networks will undergo a migration from $4^{th}$-generation LTE wireless access to the $5^{th}$-generation (5G) radio access technology known as New Radio (NR). A smooth migration without causing service interruption to the deployed Internet-of-Things (IoT) devices is extremely important to mobile network operators. Furthermore, a migration solution that ensures superior radio resource utilization efficiency and superior coexistence performance between LTE-M and NR is highly desirable.

NR resources in frequency and time domains can be configured for embedding LTE-M inside an NR carrier. FIG. 1 illustrates the placement of an LTE-M carrier within an NR transmission band. In the frequency domain, LTE-M-specific physical signals and channels are transmitted within LTE-M narrowbands. An LTE-M narrowband spans over six Physical Resource Blocks (PRBs) where each PRB consists of 12 subcarriers.

SUMMARY

Embodiments of the present invention provide for better coexistence of a first carrier with a second carrier, when the first carrier is transmitted so as to fall inside the bandwidth of a second carrier. The first and second carriers may be different radio access technologies or belong to the same radio access technology but use different configurations or modes, resulting in overlapping subcarriers. In several of the non-limiting embodiments described below, the first carrier is an LTE-M carrier transmitted within the bandwidth occupied by a second, NR carrier.

More particularly, various embodiments of the present invention address the problem of downlink PRB grid misalignment between NR and LTE-M, to ensure an efficient coexistence between two systems. Embodiments include methods for LTE-M subcarrier puncturing in which LTE-M subcarriers that exceed an NR PRB boundary can be punctured to improve NR resource utilization. Moreover, several methods are directed to minimizing the number of outlying LTE-M subcarriers that are punctured. Subcarrier puncturing may be selectively applied for different physical channels and resource allocations. Finally, methods for how such subcarrier puncturing can be effectively signaled are disclosed.

The embodiments may apply to both network nodes and wireless devices. Some of the methods may require standardization changes and some methods may be implemented without standardization impact.

Advantages of the embodiments include the effective deployment of LTE-M in coexistence with NR, while considering the tradeoff between LTE-M performance and NR resource utilization. LTE-M subcarrier puncturing addresses one of the key aspects of NR/LTE-M coexistence pertaining to the PRB misalignment between NR and LTE-M.

Embodiments described herein provide a method of network devices operating according to a novel framework for deploying LTE-M inside the NR carrier.

According to some embodiments, a method for communicating in a wireless communication network includes transmitting a signal using a first carrier having a predetermined number of subcarriers within the bandwidth of a second carrier. This transmitting is performed in such a manner that data for each of the predetermined number of subcarriers that corresponds to a partial overlap by the first carrier of a resource block of the second carrier is not transmitted.

According to other embodiments, a method for communicating in a wireless communication network includes receiving a signal using a first carrier having a predetermined number of subcarriers within the bandwidth of a second carrier. This receiving comprises discarding each of those predetermined number of subcarriers that corresponds to a partial overlap by the first carrier of a resource block of the second carrier, when decoding the received signal.

Further aspects of the present invention are directed to an apparatus, network node, base station, wireless device, user equipment (UE), network devices, MTC devices, computer program products or computer-readable storage medium corresponding to the methods summarized above and functional implementations of the above-summarized apparatus and UE.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 8 illustrates a scheme for puncturing LTE-M resource elements (REs), according to some embodiments.

FIG. 9A illustrates a flowchart of a method in a network device that is transmitting a signal, according to some embodiments.

FIG. 9B illustrates a flowchart of a method in a network device that is receiving a signal, according to some embodiments.

DETAILED DESCRIPTION

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to LTE-M and NR but can be adapted in other radio access technologies (RATs) where the techniques or selections may be relevant.

Figure 1:
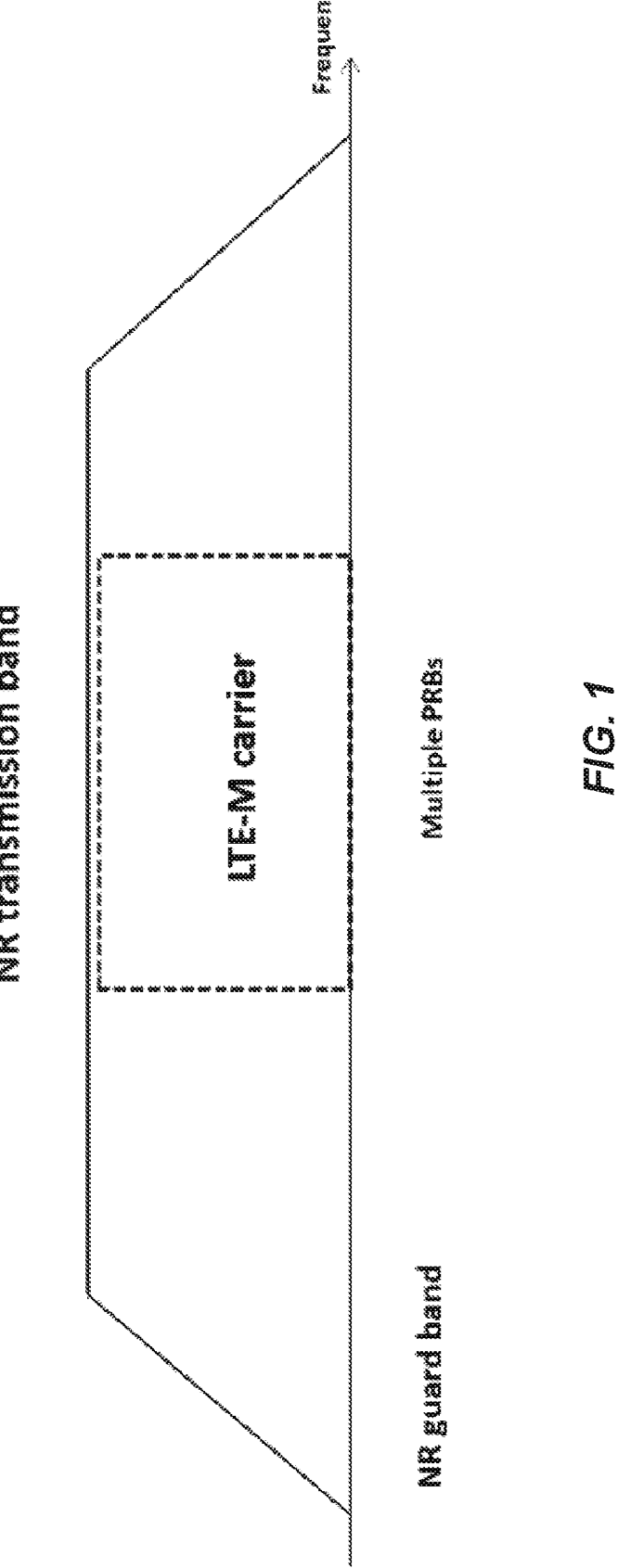
FIG. 1 illustrates an example of NR and LTE-M coexistence.

As discussed above, a first carrier. such as an LTE-M carrier, may be transmitted within the bandwidth occupied by a second carrier, such as an NR carrier. An example of this is shown in FIG. 1. In general, if the LTE-M carrier could be placed at any arbitrary place, this would satisfy its channel raster requirement. However, considerations for the efficient coexistence between NR and LTE-M include mutual interference, or preventing inter-subcarrier interference (ICI) by ensuring subcarrier grid alignment between NR and LTE-M. Another consideration includes NR resource utilization, or minimizing the number of NR resources that need to be reserved for LTE-M. This is important because reserved NR resources are not used for NR traffic.

Figure 2:
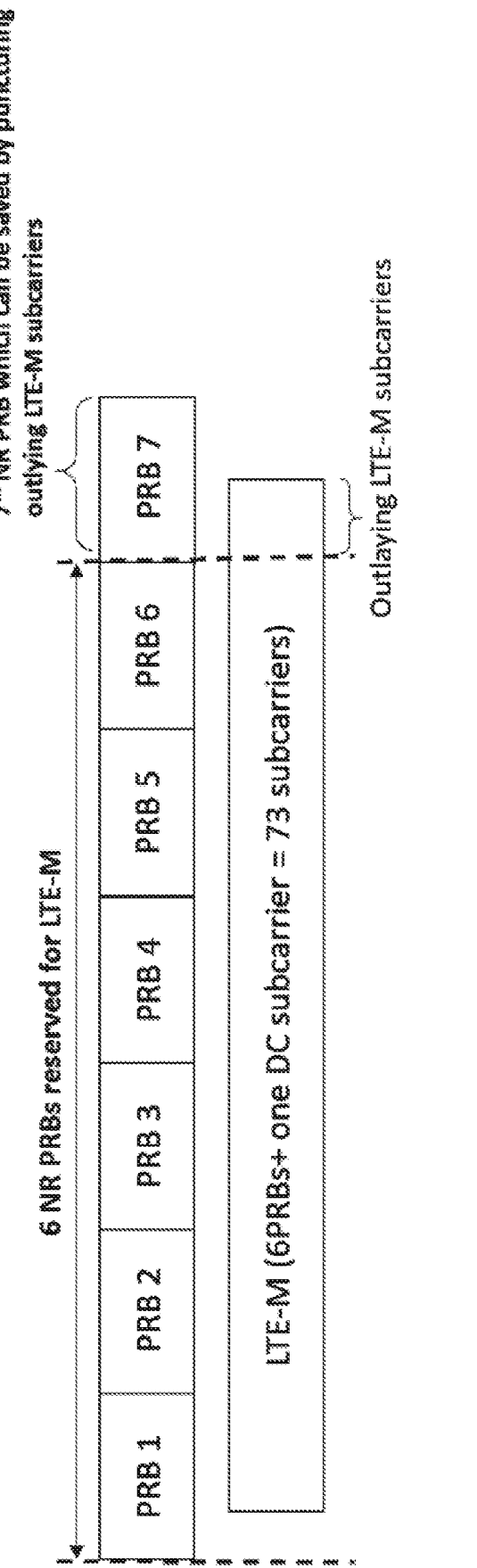
FIG. 2 illustrates example of outlying subcarriers in the coexistence of NR and LTE-M.

Due to the presence of a DC subcarrier in downlink LTE (or LTE-M), a perfect PRB alignment between LTE-M and NR is not always achieved, despite having the subcarrier grid alignment. In case of PRB misalignment, seven NR PRBs must be reserved in order to accommodate an LTE-M carrier with six PRBs. This as shown in FIG. 2. Thus, PRB grid misalignment between NR and LTE-M results in the use of an additional NR resource block.

To improve NR resource utilization, it will be beneficial to ensure that an LTE-M downlink narrowband overlaps with six NR resource blocks rather than seven, while still coexisting with the LTE-M. In this regard, one promising technique is to "puncture" outlying LTE-M subcarrier(s) that exceed the boundary of six NR PRBs reserved for LTE-M. In other words, LTE-M subcarriers which fall within the seventh NR PRB can be punctured. The term "puncturing" is used herein, with respect to a subcarrier, to indicate that the information transmitted on resource elements (REs) belonging to the subcarrier is nulled with respect to the information. In other words, puncturing includes not using the subcarrier for transmission. Data scheduled for the punctured subcarriers is not transmitted and may simply be dropped.

The subcarrier that is punctured with respect to the LTE-M signal may, or may not, be used to carry other information, such as NR traffic scheduled on the same subcarrier. On the receiving side, those subcarriers that are punctured are discarded when it comes to decoding the received LTE-M signal.

FIG. 2 illustrates an example of outlying subcarriers in the coexistence of NR and LTE-M. The term outlying subcarriers used herein may refer to subcarriers of the first carrier (group of resource blocks) that are of a predetermined number and where one or more of these only partially overlap a resource block of the second carrier (group of resource blocks).

In an example, LTE-M is scheduled within an LTE-M narrowband (six PRBs). Depending on the location of the LTE-M narrowband relative to the NR PRB grid, the LTE-M can overlap with either six or seven NR PRBs. That is, the number of outlying LTE-M subcarriers depend on the location of the LTE-M narrowband. Depending on the particular set of NR PRBs reserved for LTE-M, outlying LTE-M subcarriers can be located in the lower end (also referred to as the left side below) or upper end (the right side) of the frequency range used for the LTE-M carrier, as shown in FIGS. 3 and 4.

Figure 3:
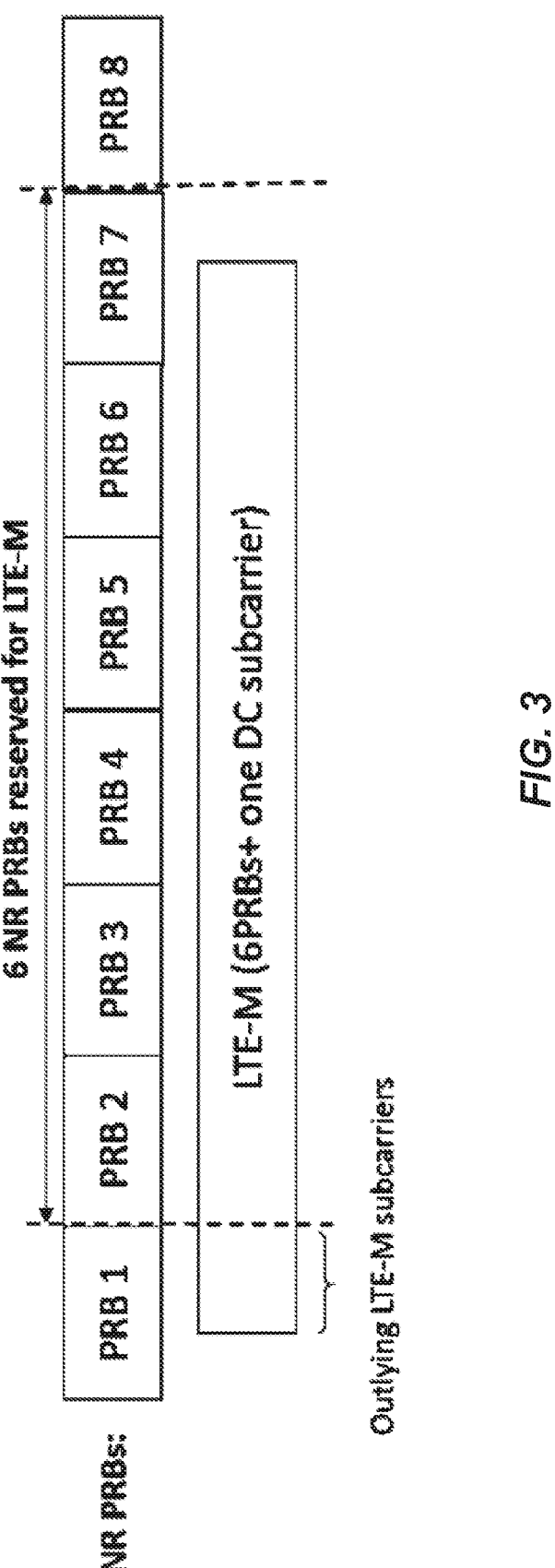
FIG. 3 illustrates outlying LTE-M subcarriers (on the lower side of the LTE-M carrier) due to PRB misalignment between NR and LTE-M.
Figure 4:
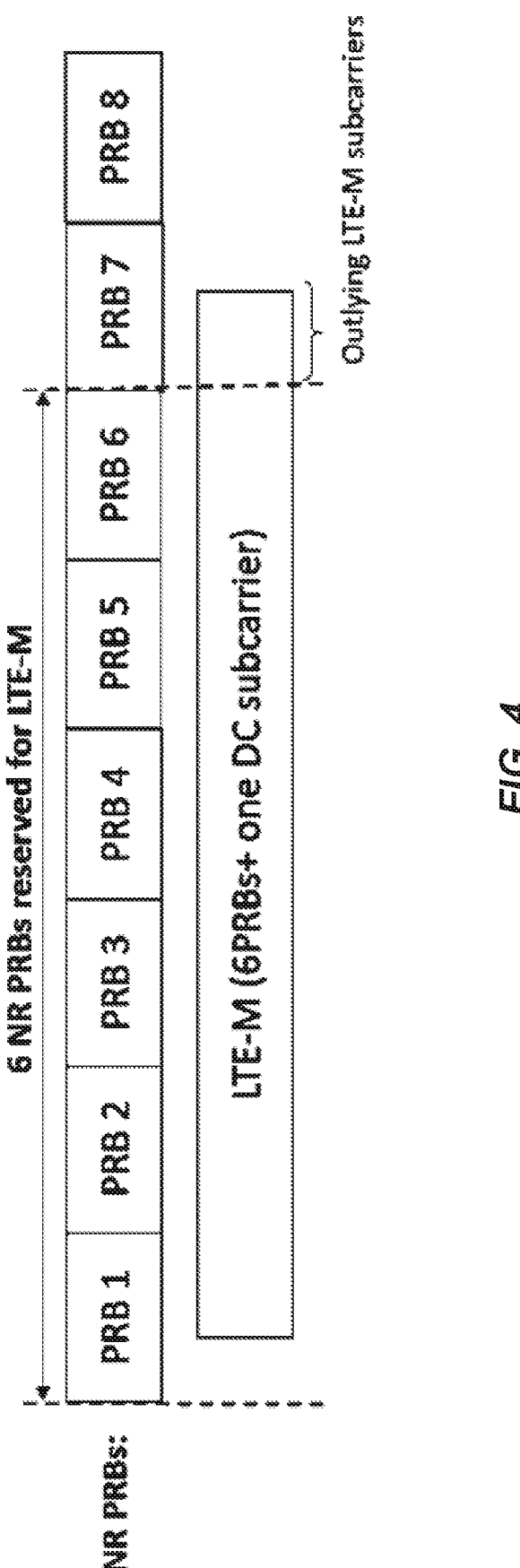
FIG. 4 illustrates outlying LTE-M subcarriers (on the right side of the LTE-M carrier) due to PRB misalignment between NR and LTE-M.
Figure 5:
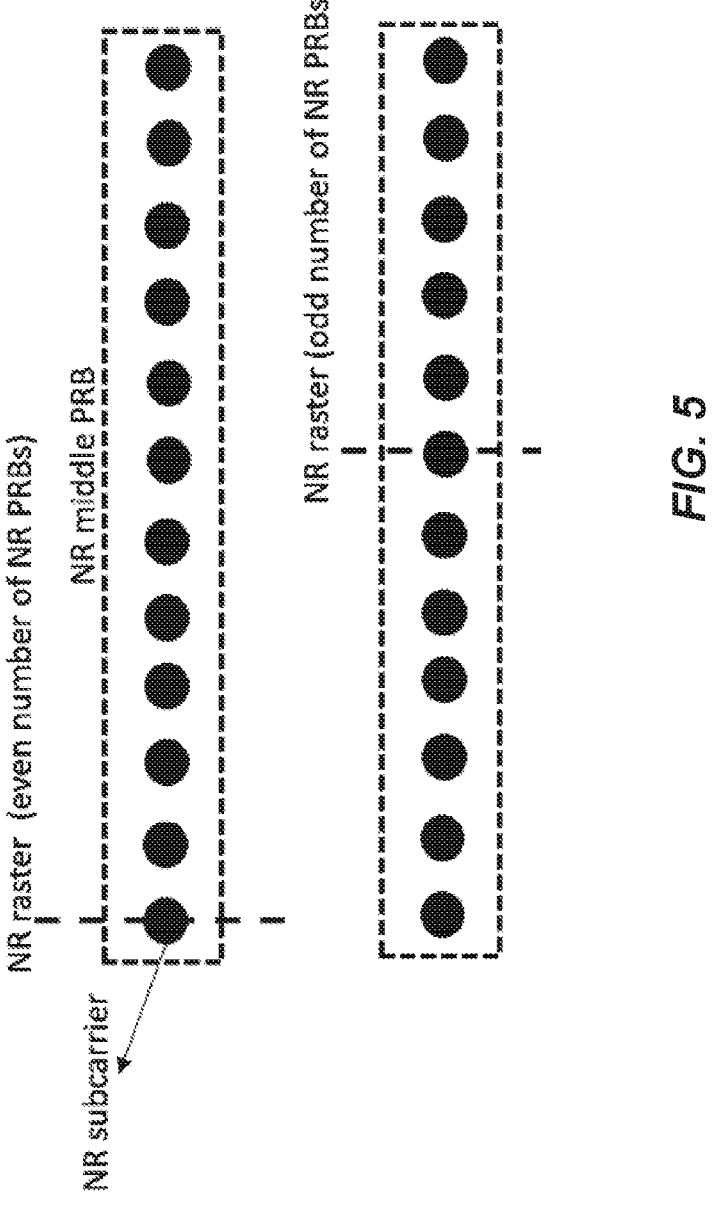
FIG. 5 illustrates a location of NR channel raster for even and odd numbers of PRBs.

FIG. 3 illustrates outlying LTE-M subcarriers (on the left side of the LTE-M carrier) due to PRB misalignment between NR and LTE-M. FIG. 4 illustrates outlying LTE-M subcarriers (on the right side of the LTE-M carrier) due to PRB misalignment between NR and LTE-M. For example, in FIG. 3, NR PRBs #2 to #7 (a total of six NR PRBs) are reserved for LTE-M. The outlying subcarriers are located within PRB #1. In FIG. 4, NR PRBs #1 to #6 (a total of six NR PRBs) are reserved for LTE-M. In this case, the outlying subcarriers are located within PRB #7.

In general, in the coexistence of NR with LTE-M, the number of outlying LTE-M subcarriers depends on the following factors: the position of the LTE-M carrier within NR (e.g., the location of the LTE-M narrowband); the particular set of PRBs used for scheduling LTE-M transmissions; and the set of NR PRBs that are reserved for LTE-M (outlying subcarriers can be on right or left side of LTE-M carrier/PRBs).

Clearly, puncturing LTE-M subcarriers can result in a performance loss, since the number of resources available for LTE-M decreases. This performance loss for an LTE-M UE depends on the number of punctured outlying subcarriers as well as the number of PRBs allocated to this UE. To limit the LTE-M resource loss from potential subcarrier puncturing, the maximum number of outlying LTE-M downlink subcarriers should be restricted. While puncturing outlying LTE-M subcarriers is beneficial in terms of NR resource utilization, it can degrade the LTE-M performance It is thus beneficial to consider subcarrier puncturing for only a small number of LTE-M downlink subcarriers. Therefore, whether to puncture outlying LTE-M subcarriers depends on the number of outlying LTE-M subcarriers. Based on the information about the number of outlying subcarriers, one can improve the efficiency of the coexistence between LTE-M and NR systems. At the same time, the number of outlying subcarriers can be minimized by efficiently adjusting the location of LTE-M and effective scheduling.

Note that while the term "LTE-M carrier" is used, it should be understood that the embodiments described herein may refer to any set of PRBs allocated for LTE-M traffic. Thus, this set may refer to, for example: the center six PRBs in an LTE (or LTE-M) system including a DC subcarrier, or PRBs located within a so called narrowband, which is a set of six contiguous PRBs, or any other set of (typically six or 24) PRBs configured for LTE-M traffic in any given subframe.

In addition, the puncturing itself may be applied to the subset of PRBs related to an MPDCCH or PDSCH transmission.

Embodiments described herein involve network devices that transmit and receive using an LTE-M system position within an 5G NR carrier, with some considerations. The focus may be on an FDD setup and 15-kHz OFDM subcarrier spacing (SCS) for both NR and LTE-M. Also, LTE-M narrowband can be considered. Other considerations include the NR raster defining a subset of NR RF reference frequencies that can be used to identify the RF channel position in the uplink and downlink The NR RF reference frequency for an RF channel maps to a resource element (e.g. a subcarrier) on the carrier. Similarly, the LTE/LTE-M raster defines a subset of LTE/LTE-M RF reference frequencies that can be used to identify the RF channel position in the uplink and downlink The LTE/LTE-M channel rasters is located in the middle of the LTE/LTE-M carrier, on the DC subcarrier in downlink One NR PRB in frequency domain consists of twelve subcarriers. The number of NR resource blocks are denoted by $N_{nr}$ which is related to the NR system bandwidth by:

As we can see, for system bandwidths of 5, 15, and 25 MHz, the number of NR PRBs is odd. For bandwidths of 10, 20, and 30 MHz, the number of NR PRBs is even. Other considerations include that the NR resource blocks are indexed from 0 to ($N_{nr}$−1). For NR carriers with an even number of PRBs ($N_{nr}$), channel raster is located on the first subcarrier of PRB with index $$\frac{N_{nr}}{2}.$$

For NR carriers with an odd number of PRBs, channel raster located on the seventh subcarrier of PRB with index ($N_{nr}$−1)/2. Here, this PRB is referred to as the middle NR PRB. FIG. 1 illustrates a location of NR channel raster for even and odd numbers of PRBs.

Minimizing the Number of Outlying LTE-M Subcarriers within an NR Carrier

Figure 6:
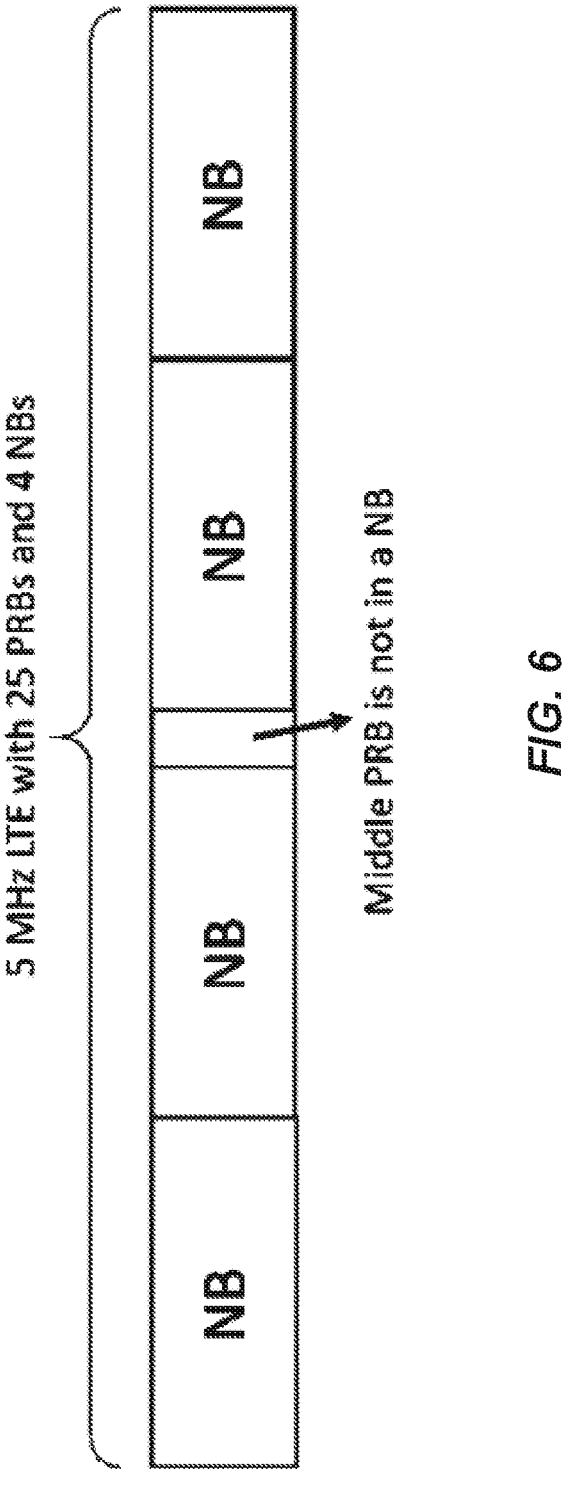
FIG. 6 illustrates locations of a narrowband within a 5-MHz LTE carrier with 25 PRBs, according to some embodiments.

In some embodiments, LTE-M (CatM1) is scheduled within an LTE-M narrowband (six PRBs). For each LTE system bandwidth, there are different sets of LTE-M narrowbands that can be used for scheduling LTE-M transmissions (see Table 2 and Table 3). For example, FIG. 6 illustrates the locations of LTE-M narrowbands (NBs) within a 5-MHz LTE system bandwidth.

Note that, while the center of the LTE carrier is on a 100-kHz channel raster, the center of an LTE-M narrowband is not necessarily located on the channel raster. In fact, only for 1.4-MHz LTE system bandwidth is the center of the narrowband aligned with the center of LTE on DC subcarrier. It should be noted that the signals and channels essential for cell search and basic system information (SI) acquisition, i.e., PSS, SSS, and PBCH, are common with LTE, and are thus located at the center of the LTE system bandwidth (around the DC subcarrier) and aligned with the 100-kHz channel raster. In case of 1.4-MHz LTE system bandwidth, there is only one narrowband whose center is on the center of the carrier. This narrowband includes the DC subcarrier thus it has 73 subcarriers in total (i.e., six PRBs+one DC subcarrier).

TABLE 1

| Number of NR resource blocks for various system bandwidths for 15 kHz SCS | | | | | | |
|---|---|---|---|---|---|---|
| NR system bandwidth (MHz) | 5 | 10 | 15 | 20 | 25 | 30 |
| Number of NR PRBs ($N_{nr}$) | 25 | 52 | 79 | 106 | 133 | 160 |

TABLE 2

| LTE-M narrowbands | | | |
|---|---|---|---|
| LTE system bandwidth | Total number of PRBs | Number of narrowbands | PRBs that are not in any narrowband |
| 1.4 MHz | 6 | 1 | None |
| 3 MHz | 15 | 2 | 3 PRBs: 1 on each edge+ 1 at the center |
| 5 MHz | 25 | 4 | 1 at the center |
| 10 MHz | 50 | 8 | 2 PRBs: 1 on each edge |
| 15 MHz | 75 | 12 | 3 PRBs: 1 on each edge+ 1 at the center |
| 20 MHz | 100 | 16 | 4 PRBs: 2 on each edge |

TABLE 3

| Locations of narrowbands within the LTE carrier | | |
|---|---|---|
| LTE system bandwidth | Total number of PRBs | Index of PRBs used for a narrowband |
| 1.4 MHz | 6 (index: 0-5) | (0-5) |
| 3 MHz | 15 (index: 0-14) | (1-6), (8-13) |

TABLE 3-continued

Locations of narrowbands within the LTE carrier

| LTE system bandwidth | Total number of PRBs | Index of PRBs used for a narrowband |
|---|---|---|
| 5 MHz | 25 (index: 0-24) | (0-5), (6-11), (13-18), (19-24) |
| 10 MHz | 50 (index: 0-49) | (1-6), (7-12), (13-18), (19-24), (25-30), (31-36), (37-42), (43-48) |
| 15 MHz | 75 (index: 0-74) | (1-6), (7-12), (13-18), (19-24), (25-30), (31-36), (38-43), (44-49), (50-55), (56-61), (62-67), (68-73) |
| 20 MHz | 100 (index: 0-99) | (2-7), (8-13), (14-19), (20-25), (26-31), (32-37), (38-43), (44-49), (50-55), (56-61), (62-67), (68-73), (74-79), (80-85), (86-91), (92-97) |

FIG. 2 illustrates locations of LTE-M narrowbands (NBs) within a 5-MHz LTE carrier with 25 PRBs. Depending on the location of a particular LTE-M narrowband, the LTE-M narrowband can overlap with either six or seven NR PRBs. That is, the number of outlying LTE-M subcarriers depends on the specific location of the LTE-M narrowband. In some embodiments of the presently disclosed techniques, the LTE-M transmissions are scheduled on an LTE-M narrowband where the number of outlying LTE-M subcarriers (with respect to NR) is minimal In other embodiments, the position of the LTE-M/LTE carrier relative to the NR carrier is adjusted such that the number of outlying subcarriers is minimized In other embodiments, the PRB alignment between NR and LTE-M is achieved by scheduling LTE-M on LTE-M narrowbands located below the DC subcarrier. In some embodiments, the puncturing of outlying subcarriers is applied only to the outmost PRB (to the left or right) in the narrowband in which the UE is configured to operate.

In one example, NR and LTE have the same system bandwidth and their channel rasters are co-located. LTE-M is scheduled within an LTE-M narrowband. To avoid having any outlying LTE-M subcarrier, the LTE-M signal may be scheduled within the following narrowbands:

TABLE 4

Best narrowbands for scheduling LTE-M to avoid any outlying subcarrier.

| LTE and NR system bandwidth | Index of LTE PRBs (starting from 0) used for a narrowband |
|---|---|
| 5 MHz | (0-5), (6-11) |
| 10 MHz | (1-6), (7-12), (13-18), (19-24) |
| 15 MHz | (1-6), (7-12), (13-18), (19-24), (25-30), (31-36) |
| 20 MHz | (2-7), (8-13), (14-19), (20-25), (26-31), (32-37), (38-43), (44-49) |

In some embodiments, LTE/LTE-M is with a 1.4-MHz system bandwidth (one narrowband). For NR system bandwidths of 10 MHz, 20 MHz, 30 MHz, to ensure a minimum number of outlying subcarriers, the LTE-M center may be placed based on:

$$F_{nr,raster}=F_{lte,raster}+300q, \text{ [kHz], for } q=3n$$

where n is an integer, where $F_{nr,raster}$ and $F_{lte,raster}$ are the frequencies of NR channel raster and LTE channel raster. q is an integer, and is chosen based on the NR frequency range as well as the location of the LTE carrier.

In the coexistence of NR with LTE, i to satisfy the raster grid constraint and subcarrier orthogonality, the NR channel raster relative to LTE channel raster can be given by:

$$F_{nr,raster}=F_{lte,raster}-300q, \text{ [kHz]}$$

This means that the NR channel raster can be shifted by factors of 20 subcarriers (i.e., 0, 20, 40, 60, . . . ) or (factors of 300 kHz), relative to the LTE-M channel raster. For example, for q=0, the NR raster and the LTE raster will be aligned, which implies that the NR and LTE channel rasters are co-located. Depending on the value of q (i.e., the relative positions of NR and LTE), the LTE system bandwidth, and the location of narrowband, the number of outlying LTE-M subcarriers can be different.

In some embodiments, one outlying LTE-M subcarrier on the right side of the LTE-M narrowband is punctured. For NR system bandwidths: 5 MHz, 15 MHz, 25 MHz. To ensure a minimum number of outlying subcarriers, the LTE-M center may be placed based on:

$$F_{nr,raster}=F_{lte,raster}+300q, \text{ [kHz], for } q=3n+1 \text{ where } n \text{ is integer.}$$

In other embodiments, two outlying LTE-M subcarriers on the left (lower-frequency) side of the LTE-M narrowband are punctured.

Puncturing of Outlying LTE-M Subcarriers Based on Resource Allocation

Above, the discussion on subcarrier puncturing has mainly considered subcarrier puncturing for the case of LTE-M using six PRBs (one narrowband). This applies, for example, to the case of common control signaling, system information transmission and more. However, LTE-M allows for a dynamic use of PRBs, both for control signaling using the MTC Physical Control Channel (MPDCCH) and data transmission using the Physical Downlink Shared Channel (PDSCH). In brief, some basic flexibility of LTE-M downlink resource usage in this respect can be described as follows.

For MPDCCH, the UE is configured to monitor MPDCCH transmissions in an MPDCCH-PRB set consisting of two, four, or six contiguous PRBs within a narrowband, where the sets of size two and four are located at the edge of a narrowband. In the frequency domain, an MPDCCH transmission may make use of all or a fraction of the resource elements within the MPDCCH-PRB set. Specifically, for so called localized transmission, an MPDCCH transmission may be located in ¼, ½, 1, 2, 4 or 6 PRBs, regardless of the set of the MPDCCH-PRB set. This is in contrast to so-called distributed transmission, in which case the MPDCCH transmission always occupies resource elements throughout the whole MPDCCH-PRB set.

For PDSCH, a Rel-13 LTE-M UE can be allocated PDSCH transmissions using any number of one to six adjacent PRBs with arbitrary placement within a narrowband. (Herein, "Rel-13," "Rel-14," Rel-15," etc., refer to Release 13, Release 14, and Release 15 of the 3GPP specifications.) For an LTE-M UE of category M2, which was introduced in LTE Rel-14, the resource allocation is done such that the allocation above mentioned for a Rel-13 LTE-M UE may be repeated in up to four adjacent narrowbands. Thus, when the allocation within one narrowband is less than six PRBs, any repetition in adjacent narrowbands will result in gaps of non-allocated PRBs. In Rel-15, the possibility to allocate PDSCH in a more flexible way was introduced, such that the allocation is not restricted to be defined within a single narrowband but can extend outside narrowband borders.

Given the above scheduling flexibility for MPDCCH and PDSCH, several embodiments can be envisioned. In one embodiment, the puncturing of outlying subcarriers is applied to the outmost PRB of the set of PRBs allocated to the UE. For an MPDCCH transmission, this typically would apply to the two, four, or six PRBs of in the configured MPDCCH-PRB set. As an example, when the MPDCCH-PRB set consists of two or four PRBs, the outlying one or more subcarriers associated with these PRBs are punctured, also when these subcarriers are located within the interior of the narrowband in which the MPDCCH is transmitted. Additionally, or alternatively, the puncturing is applied to the outlying subcarriers of the subset of PRBs within the monitored MPDCCH-PRBs set that are used for transmission of a particular MPDCCH candidate. Similarly, for a PDSCH transmission, the outlying one or more subcarriers associated with the PRBs used for the scheduled PDSCH transmission are punctured. By following this more dynamic subcarrier puncturing scheme, the PRBs belonging to the narrowband, but not used for MPDCCH or PDSCH transmissions can instead be used for scheduling NR transmissions.

Figure 7:
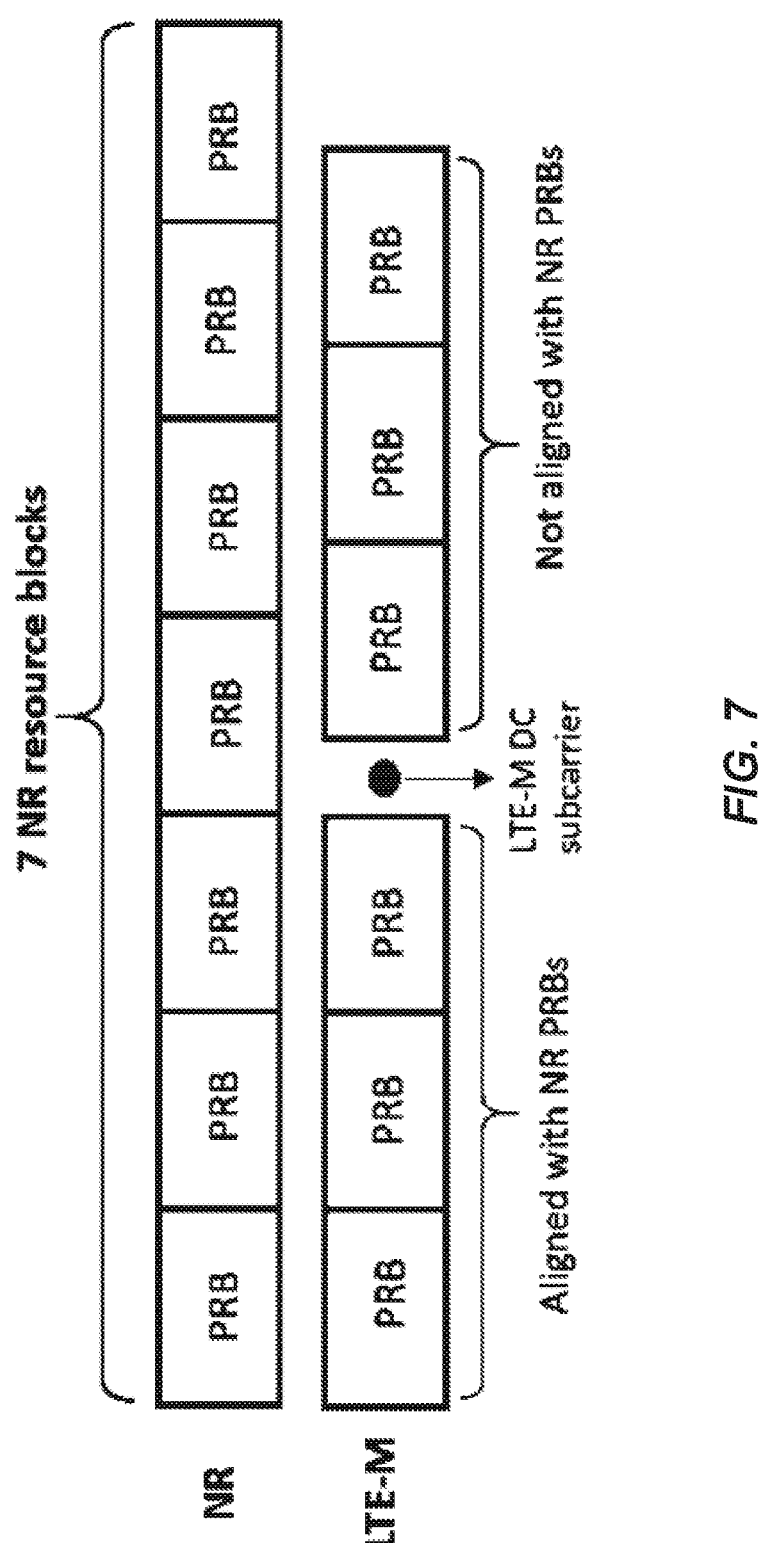
FIG. 7 illustrates a case in which LTE-M (1.4-MHz) PRBs on the lower side of DC subcarrier are aligned with NR PRB grid, according to some embodiments.

In some embodiments, MPDCCH and PDSCH are scheduled on PRBs with minimum offset relative to the NR PRB grid (i.e., minimum number of outlying subcarriers). For instance, in some cases LTE-M PRBs on the left side of the DC subcarriers are aligned with NR PRBs, as shown in FIG. 7. By using those PRBs for LTE-M MPDCCH and PDSCH, a minimum number of NR PRBs need to be reserved.

In some embodiments, puncturing is dynamically enabled based on the number of outlying subcarriers and the number of PRBs allocated to corresponding LTE-M channels/signals (considering the potential performance loss due to puncturing). FIG. 7 illustrates a case in which LTE-M (1.4 MHz) PRBs on the left side of DC subcarrier are aligned with NR PRB grid.

Subcarrier Puncturing Method

Depending on the scenario and the relative location of NR and LTE-M, six or seven NR PRBs should be semi-statically reserved for an LTE-M narrowband in downlink When six NR PRBs are reserved, outlying LTE-M subcarriers (excluding CRS) should be punctured and LTE-M transmissions is done within these reserved six PRBs. In the puncturing case, the eNB may avoid the transmission on the outlying LTE-M downlink subcarriers, without even informing LTE-M legacy UEs (i.e., backward compatible).

In some embodiments, information about the punctured subcarriers is explicitly communicated to a UE by the network. In other embodiments, the UE is otherwise made aware of the puncturing scheme used, for example as indicated by a standardization document. The information may be explicit, e.g. in terms of explicit subcarriers being punctured, or implicit, e.g. in terms of rules to apply in order to determine how and when puncturing is being applied. The information about puncturing may apply to all transmissions, or selectively to a subset of the transmissions as indicated by the various embodiments presented above. This includes puncturing being applied differently to different physical channels or signals, and different resource allocations.

In some embodiments, information about puncturing is conveyed from the network to the UE semi-statically, via Radio Resource Control (RRC) signaling. This RRC signaling can be broadcasted to all UEs in system information, or it can be transmitted using dedicated RRC signaling.

In some embodiments, information about the puncturing is conveyed in more dynamic fashions. For example, a Medium Access Control (MAC) element can be used to inform the UE that the use of all or some puncturing is being activated or deactivated. On an even more dynamic scale, it is possible to use dynamic downlink control information (DCI) signaling to indicate whether puncturing for specified REs is enabled or not, e.g., as illustrated in FIG. 8. This allows efficient use of an NR PRB for LTE-M when it is not used for NR UEs. In this case, RE puncturing can be avoided to maintain the LTE-M performance.

Thus, in some embodiments, the set of subcarriers that can be punctured is semi-statically signaled via RRC signaling. In other embodiments, dynamic DCI signaling can be used to indicate whether puncturing for specified REs (i.e., subcarriers) is enabled. FIG. 8 illustrates an example scheme for puncturing LTE-M REs, according to some embodiments.

The embodiments described herein for puncturing, LTE-M subcarriers can be implemented in a network node such as an eNodeB, or any equivalent thereof. In some of these embodiments, the puncturing operation corresponds to nulling the LTE-M transmission that would have occurred on the subcarriers being punctured. These subcarriers may then be used for, e.g. transmitting NR signals, by the same network node or by a different network node.

The embodiments for puncturing LTE-M subcarriers can be implemented in a wireless device, such as a User Equipment (UE), a wireless terminal, an LTE-M device, an MTC (Machine Type Communication) device, or any equivalent thereof. In some of these embodiments, the puncturing operation takes place when the wireless device receives a data transmission where a portion of the signal corresponding to the subcarriers that are subject to puncturing is discarded. The data transmission is decoded taken into account information transmitted on the non-punctured subcarriers only. In order to do so, the wireless device needs information on what subcarriers are being subject to puncturing. Such information may be conveyed to the wireless device in several ways, as has been outlined above.

Embodiments have been described in terms of puncturing LTE-M subcarriers overlapping with subcarriers used for NR. This merely serves as an example scenario, and other systems are not precluded. In some embodiments, the puncturing instead takes place on the NR resources and the LTE-M resources are left unaltered. In other embodiments, the puncturing as outlined herein is instead applied to a situation where one or two of the LTE-M or NR systems are replaced by another wireless radio access technology. The embodiments described herein can be used separately or combined.

FIG. 9A illustrates a method 900 for a network device that is transmitting a signal according to one or more of the techniques described herein. Method 900 includes transmitting using a first carrier having a predetermined number of subcarriers within the bandwidth of a second carrier, such that data for one or more of the predetermined number of subcarriers corresponding to a partial overlap by the first carrier of a resource block of the second carrier is not transmitted (block 902). To be clear, what is meant here is that data is not transmitted in the signal using the first carrier for each and every subcarrier that corresponds to this partial overlap, so that those subcarriers are not taken away from the second carrier.

FIG. 9B illustrates a method 910 for a network device that is transmitting. Method 910 includes receiving a signal carried by a first carrier having a predetermined number of subcarriers within the bandwidth of a second carrier, such that one or more of the predetermined number of subcarriers corresponding to a partial overlap by the first carrier of a resource block of the second carrier are discarded when decoding the received signal (block 912). Put somewhat differently, the receiving of this signal comprises discarding each one of the predetermined number of subcarriers that corresponds to the partial overlap. It will be appreciated that this is done because data was not transmitted in these subcarriers in the signal of the first carrier—any data in those subcarriers may belong to the second carrier and thus be targeted to a different device.

The following describes variations and details of some embodiments of the method 900. The equivalent variations and details are application to embodiments of the method 910 as well. In some embodiments, the partial overlap by the first carrier of the resource block of the second carrier occurs at an outmost resource block of the first carrier. In some embodiments, the partial overlap by the first carrier of the resource block of the second carrier occurs at an end resource block of a proper subset of resource blocks of the first carrier.

In the method 900 (or 910), the resource blocks of the first carrier may be scheduled (e.g, by a transmitting base station) so as to limit the impact of any of the one or more predetermined subcarriers that are not decoded or do not have its data transmitted. The resource blocks of the first carrier are scheduled in first carrier narrowbands that are below a direct current (DC) subcarrier of the first carrier.

The first carrier is positioned (e.g., by the transmitting base station) within the second carrier so that only one subcarrier corresponds to the partial overlap and is not decoded or does not have its data transmitted, in some embodiments. In other embodiments, the first carrier is positioned within the second carrier so that only two subcarriers of the first carrier correspond to the partial overlap and are not decoded or do not have its data transmitted.

The first carrier may be a Long Term Evolution-Machine Type Communication (LTE-M) carrier and the second carrier is a New Radio (NR) carrier.

In some embodiments, the center of the LTE-M carrier is positioned within the NR carrier so that:

$$F\_(nr,raster)=F\_(lte,raster)+300q, \text{ [kHz], for } q=3n,$$

wherein n is an integer, F_(nr,raster) is the NR channel raster frequency, F_(lte,raster) is the LTE channel raster frequency, and q is an integer chosen based on the NR frequency range and the location of the LTE-M carrier.

The resource blocks of the LTE-M carrier may be scheduled within any of the following LTE-M narrowbands, in various embodiments or instances of the methods illustrated in FIG. 9A and FIG. 9B:

| LTE and NR system bandwidth | Index of LTE PRBs (starting from 0) used for a narrowband |
|---|---|
| 5 MHz | (0-5), (6-11) |
| 10 MHz | (1-6), (7-12), (13-18), (19-24) |
| 15 MHz | (1-6), (7-12), (13-18), (19-24), (25-30), (31-36) |
| 20 MHz | (2-7), (8-13), (14-19), (20-25), (26-31), (32-37), (38-43), (44-49) |

In some embodiments, the one or more LTE-M subcarriers that are not used for LTE-M transmission or reception are limited to the ones of the LTE-M subcarriers that are associated with MTC physical downlink control channel (MPDCCH) resource blocks. The one or more LTE-M subcarriers that are not used for LTE-M transmission or reception may be limited to LTE-M subcarriers associated with physical downlink shared channel (PDSCH) resource blocks, in other embodiments.

In additional embodiments, the resource blocks of the LTE-M carrier below a direct current (DC) subcarrier of the LTE-M carrier are aligned with NR resource blocks and/or the transmitting or receiving is subject to aligning subcarriers in LTE-M and NR on the same grid and subject to raster placement.

Embodiments of the methods 900 and/or 910 may further include sending or receiving information about subcarriers that correspond to the partial overlap and/or that are not decoded or do not have their data transmitted. Thus, for example, a transmitting base station may inform the receiving UE that certain subcarriers are not used for a downlink signal, and that these subcarriers should thus be discarded when decoding the signal. As another example, a base station may inform a UE scheduled for an uplink transmission that certain subcarriers should not be used, so that the UE knows to omit transmitting on those subcarriers.

Embodiments of the described methods may further include features wherein the radio access technology (RAT) of the first carrier is different than the RAT of the second carrier and/or wherein the first and second carriers belong to the same radio access technology but use different configurations or modes resulting in overlapping subcarriers.

The network devices may utilize the LTE-M carrier center positions in coexistence with NR bandwidth, as described above, when communicating with other devices or nodes. Examples of such network devices includes network nodes and wireless devices as described below.

Methodologies may be used to determine the position of an LTE-M carrier to be placed within an NR carrier, to ensure orthogonality between NR and LTE-M. To this end, the locations of LTE-M carrier, for which the NR and LTE-M subcarriers can be aligned, need to be identified. In particular, what needs to be identified are the possible locations of the LTE-M carrier center for which subcarrier grid alignment can be achieved and where the number of NR RBs in transmission band can be minimized For various NR frequency bands with a specific number of RBs (or carrier bandwidths), the possible locations of LTE-M carrier centers will be determined as well as the number of NR RBs, which need to be reserved for accommodating the coexistence of NR and LTE-M.

Figure 10:
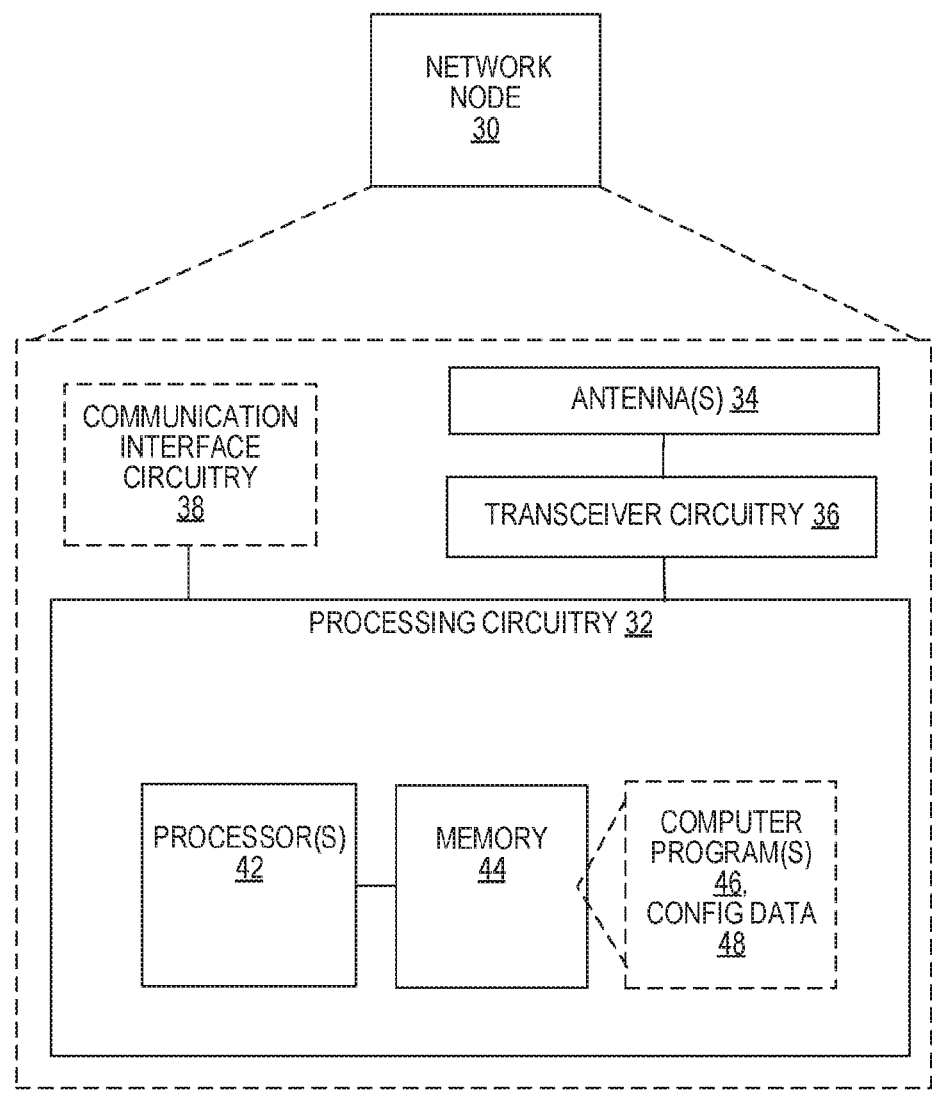
FIG. 10 illustrates a block diagram of a network device that is a network node, according to some embodiments.

FIG. 10 shows an example network node 30 that may be configured to carry out one or more of these disclosed techniques. Network node 30 may be an evolved Node B (eNodeB), Node B or gNB. While a network node 30 is shown in FIG. 10, the operations can be performed by other kinds of network access nodes, including a radio network node such as base station, radio base station, base transceiver station, base station controller, network controller, NR BS, Multi-cell/multicast Coordination Entity (MCE), relay node, access point, radio access point, Remote Radio Unit (RRU) Remote Radio Head (RRH), or a multi-standard BS (MSR BS). Network node 30 may also, in some cases, be a core network node (e.g., MME, SON node, a coordinating node, positioning node, MDT node, etc.), or even an external node (e.g., 3rd party node, a node external to the current network), etc. Network node 30 may also comprise test equipment.

In the non-limiting embodiments described below, network node 30 will be described as being configured to operate as a cellular network access node in an LTE network or NR network. In some embodiments, the technique can be implemented in the RRC layer. The RRC layer could be implemented by one or more network nodes in a cloud environment and hence some embodiments can be implemented in a cloud environment.

Those skilled in the art will readily appreciate how each type of node may be adapted to carry out one or more of the methods and signaling processes described herein, e.g., through the modification of and/or addition of appropriate program instructions for execution by processing circuits 32.

Network node 30 facilitates communication between wireless terminals (e.g., UEs), other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed hereinafter.

Processing circuitry 32 of the network node 30 is configured, according to some embodiments, to perform the techniques described herein for the network node, including methods 900 and 910. Processing circuitry 32 is configured to transmit using a first carrier having a predetermined number of subcarriers within the bandwidth of a second carrier, such that data for one or more of the predetermined number of subcarriers corresponding to a partial overlap by the first carrier of a resource block of the second carrier is not transmitted. Processing circuitry 32 is also configured to receive using a first carrier having a predetermined number of subcarriers within the bandwidth of a second carrier, such that one or more of the predetermined number of subcarriers corresponding to a partial overlap by the first carrier of a resource block of the second carrier are discarded when decoding the received signal.

Figure 11:
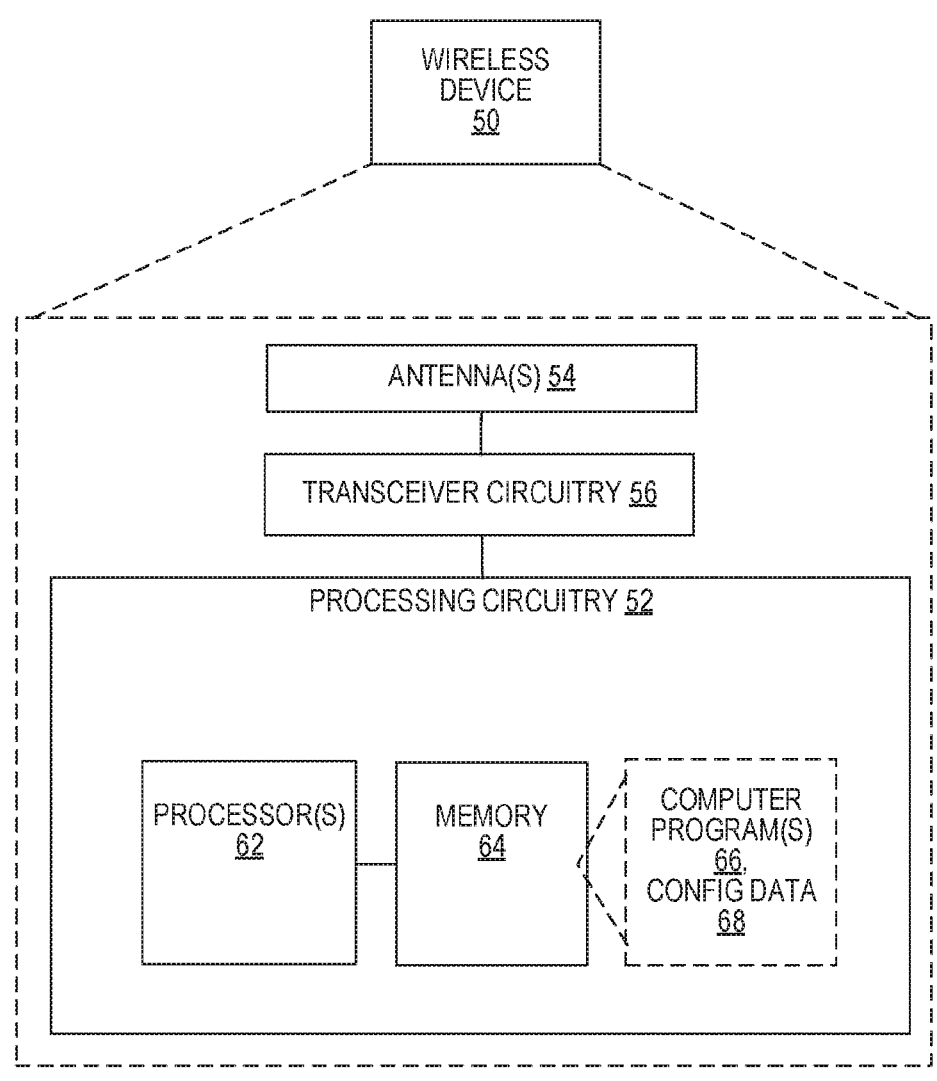
FIG. 11 illustrates is a block diagram of a network device that is a wireless device, according to some embodiments.

FIG. 11 illustrates a diagram of a wireless device 50 configured to carry out the techniques described above, according to some embodiments. Wireless device 50 may be considered to represent any wireless devices or terminals that may operate in a network, such as a UE in a cellular network. Other examples may include a communication device, target device, MTC device, IoT device, device to device (D2D) UE, machine type UE or UE capable of machine to machine communication (M2M), a sensor equipped with UE, PDA (personal digital assistant), tablet, IPAD tablet, mobile terminal, smart phone, laptop embedded equipped (LEE), laptop mounted equipment (LME), USB dongles, Customer Premises Equipment (CPE), etc.

Wireless device 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services. This radio access technologies can be NR and LTE for the purposes of this discussion.

Wireless device 50 also includes one or more processing circuits 52 that are operatively associated with the radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed hereinafter.

Processing circuitry 52 of the wireless device 50 is configured, according to some embodiments, to perform the techniques described herein for the network node, including methods 900 and 910. Processing circuitry 52 is configured to transmit using a first carrier having a predetermined number of subcarriers within the bandwidth of a second carrier, such that data for one or more of the predetermined number of subcarriers corresponding to a partial overlap by the first carrier of a resource block of the second carrier is not transmitted. Processing circuitry 52 is also configured to receive using a first carrier having a predetermined number of subcarriers within the bandwidth of a second carrier, such that one or more of the predetermined number of subcarriers corresponding to a partial overlap by the first carrier of a resource block of the second carrier are discarded when decoding the received signal.

Figure 12:
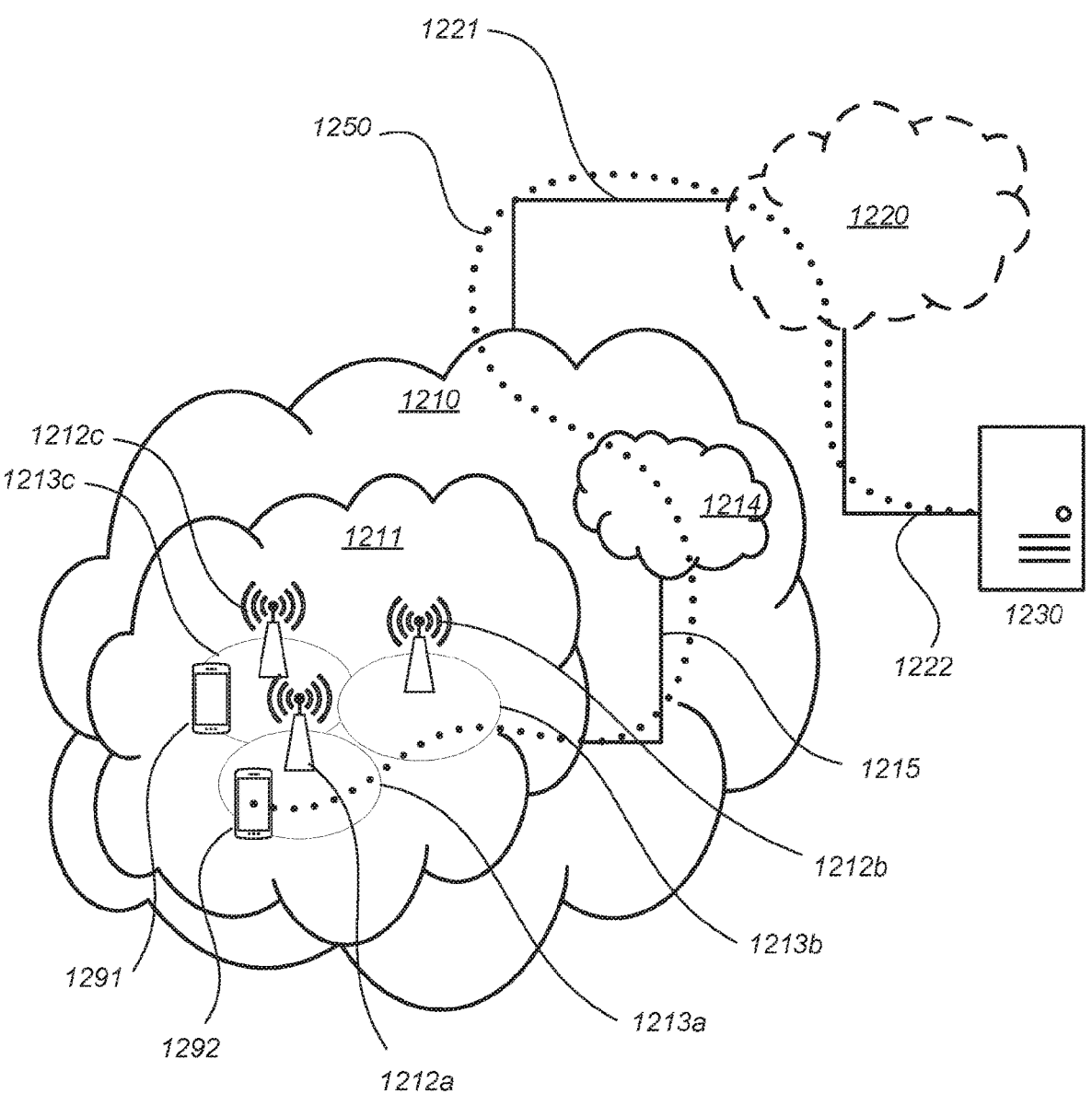
FIG. 12 schematically illustrates a telecommunication network connected via an intermediate network to a host computer, according to some embodiments.

FIG. 12 illustrates a communication system that includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first UE 1271 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 may not or need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
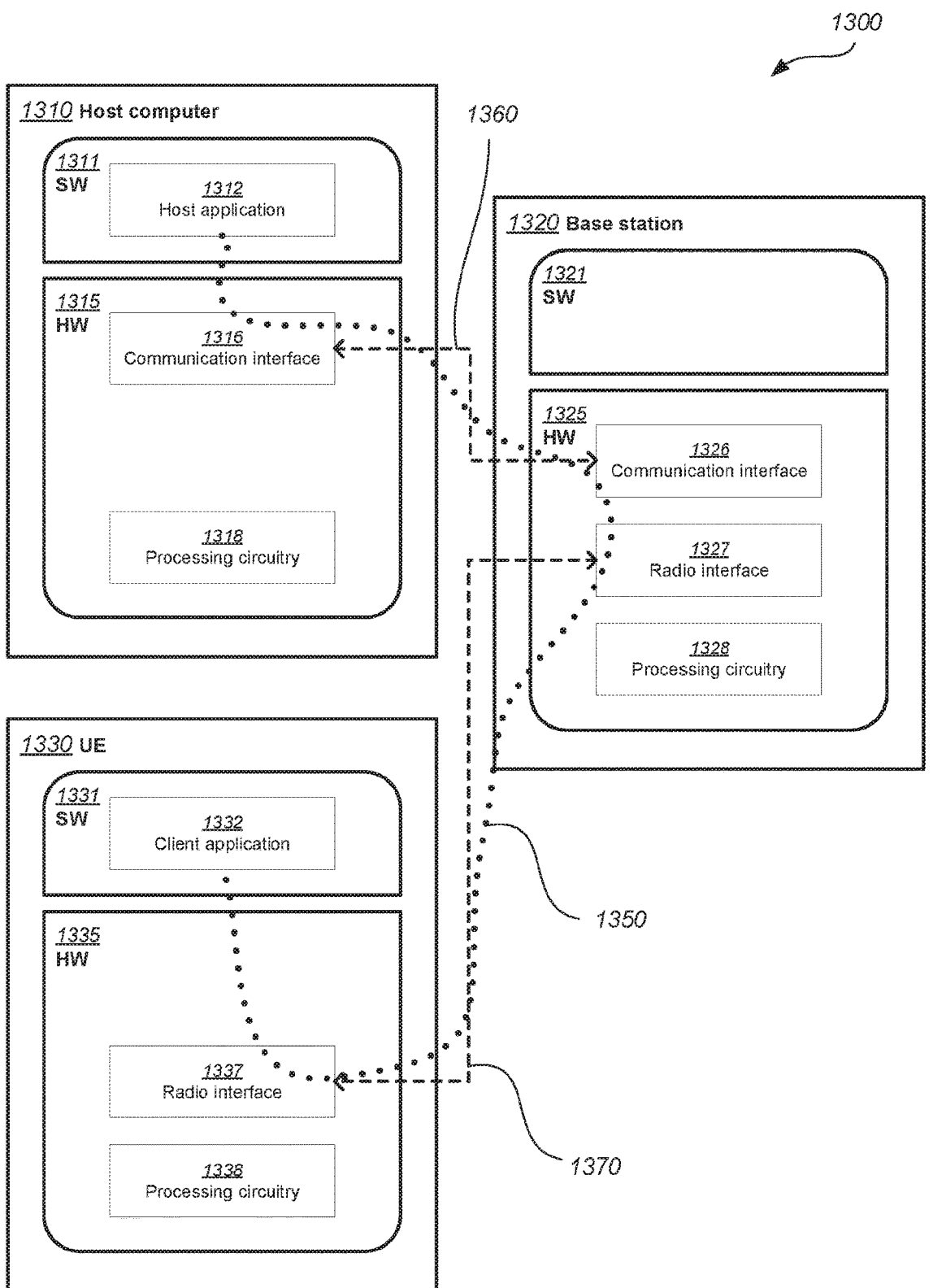
FIG. 13 is a generalized block diagram of a host computer communicating via a base station with a user equipment over a partially wireless connection, according to some embodiments.

It is noted that the host computer 1310, base station 1320 and UE 1330 illustrated in FIG. 13 may be identical to the host computer 1230, one of the base stations 1212*a*, 1212*b*, 1212*c* and one of the UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the use equipment 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure, such as provided by nodes such as wireless device 50 and network node 30, along with the corresponding method 400. The embodiments described herein provide for the effective deployment of LTE-M in coexistence with NR. More specially, the embodiments address problems of subcarrier grid alignment and resource efficiency, which are the key issues in the coexistence of NR and LTE-M. The teachings of these embodiments may improve the data rate, capacity, latency and/or power consumption for the network and UE 1330 using the OTT connection 1350.

A measurement procedure may be provided for the purpose of monitoring data rate, latency and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or 'dummy' messages, using the OTT connection 1350 while it monitors propagation times, errors, etc.

Figures 14, 15:
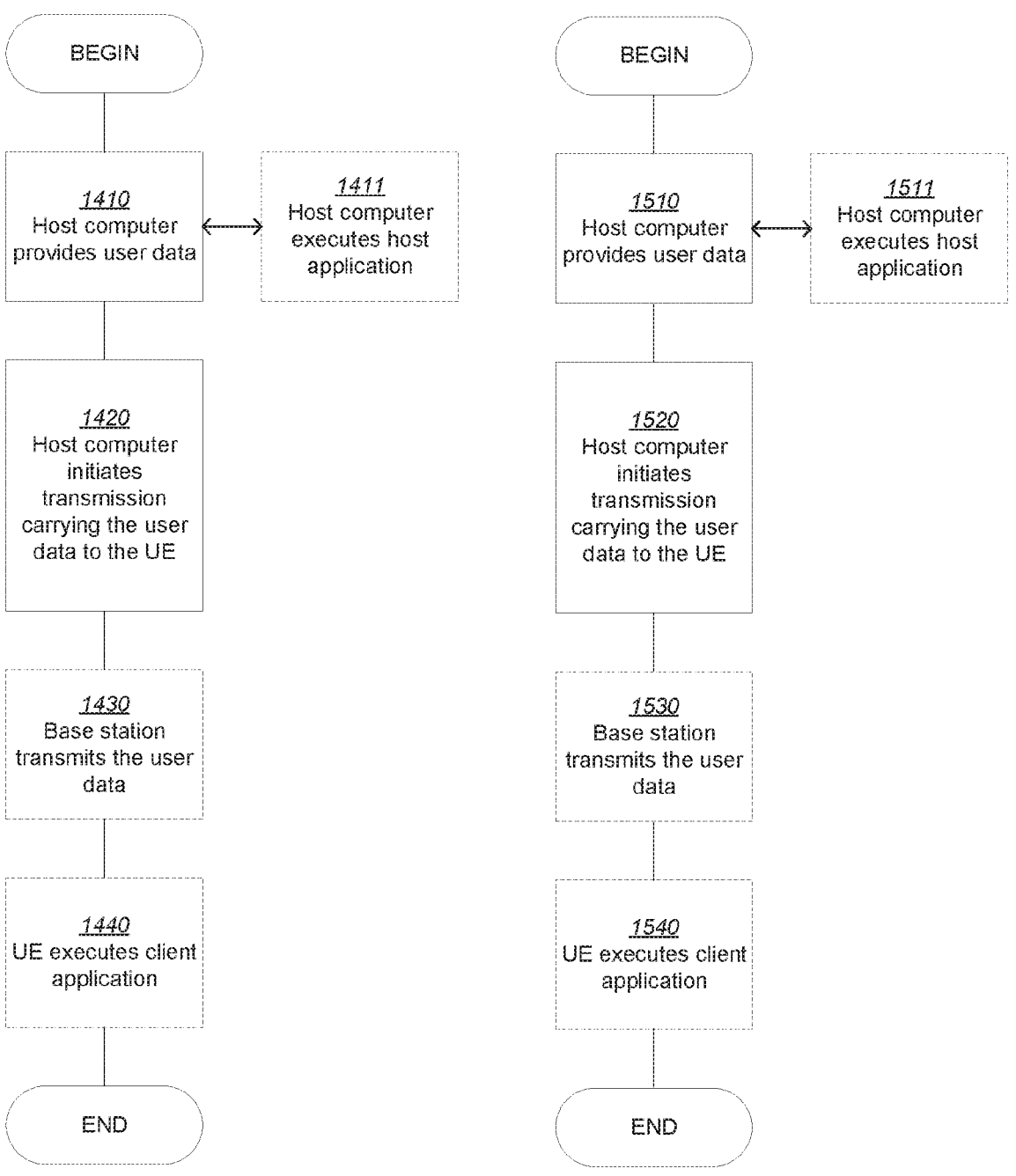
FIG. 14, FIG. 15, FIG. 16, and FIG. 17 are flowcharts illustrating example methods implemented in a communication system including a host computer, a base station and a user equipment.

FIG. 14 is a flowchart illustrating an example method implemented in a communication system. The communication system includes a host computer, a base station and a UE which may be those described with reference to FIGS. 12 and 13. For simplicity of the present disclosure, only drawing references to FIG. 14 will be included in this section. In a first step 1410 of the method, the host computer provides user data. In an optional substep 1411 of the first step 1410, the host computer provides the user data by executing a host application. In a second step 1420, the host computer initiates a transmission carrying the user data to the UE. In an optional third step 1430, the base station transmits to the UE the user data which was carried in the transmission that the host computer initiated, in accordance with the teachings of the embodiments described throughout this disclosure. In an optional fourth step 1440, the UE executes a client application associated with the host application executed by the host computer.

FIG. 15 is a flowchart illustrating an example method implemented in a communication system. The communication system includes a host computer, a base station and a UE which may be those described with reference to FIGS. 12 and 13. For simplicity of the present disclosure, only drawing references to FIG. 15 will be included in this section. In a first step 1510 of the method, the host computer provides user data. In an optional substep (not shown) the host computer provides the user data by executing a host application. In a second step 1520, the host computer initiates a transmission carrying the user data to the UE. The transmission may pass via the base station, in accordance with the teachings of the embodiments described throughout this disclosure. In an optional third step 1530, the UE receives the user data carried in the transmission.

Figures 16, 17:
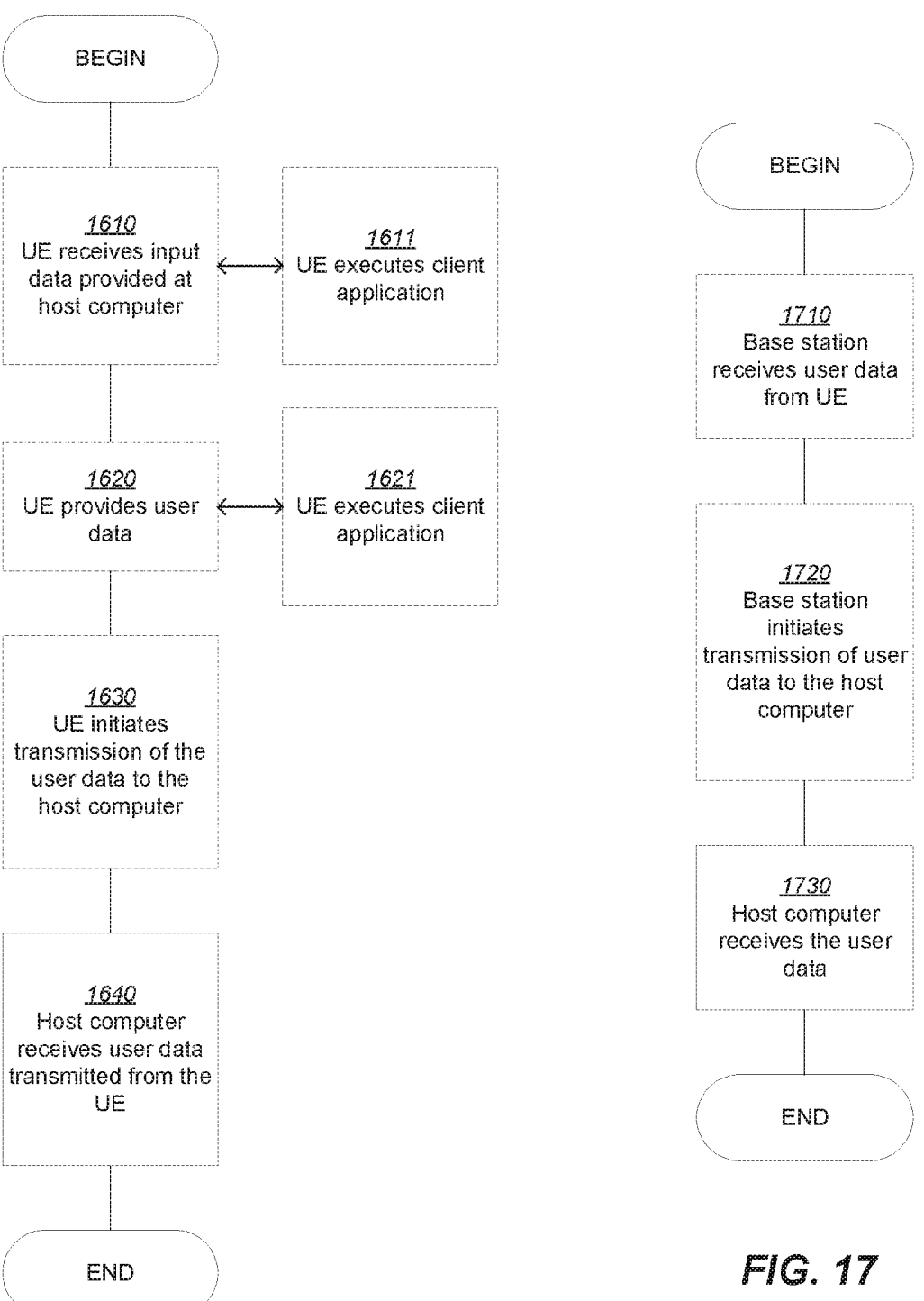

FIG. 16 is a flowchart illustrating an example method implemented in a communication system. The communication system includes a host computer, a base station and a UE which may be those described with reference to FIGS. 12 and 13. For simplicity of the present disclosure, only drawing references to FIG. 16 will be included in this section. In an optional first step 1610 of the method, the UE receives input data provided by the host computer. Additionally, or alternatively, in an optional second step 1620, the UE provides user data. In an optional substep 1621 of the second step 1620, the UE provides the user data by executing a client application. In a further optional substep 1611 of the first step 1610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1630, transmission of the user data to the host computer. In a fourth step 1640 of the method, the host computer receives the user data transmitted from the UE, in accordance with the teachings of the embodiments described throughout this disclosure.

FIG. 17 is a flowchart illustrating an example method implemented in a communication system. The communication system includes a host computer, a base station and a UE which may be those described with reference to FIGS. 12 and 13. For simplicity of the present disclosure, only drawing references to FIG. 17 will be included in this section. In an optional first step 1710 of the method, in accordance with the teachings of the embodiments described throughout this disclosure, the base station receives user data from the UE. In an optional second step 1720, the base station initiates transmission of the received user data to the host computer. In a third step 1730, the host computer receives the user data carried in the transmission initiated by the base station.

As discussed in detail above, the techniques described herein, e.g., as illustrated in the process flow diagrams of FIGS. 9A and 9B, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 18:
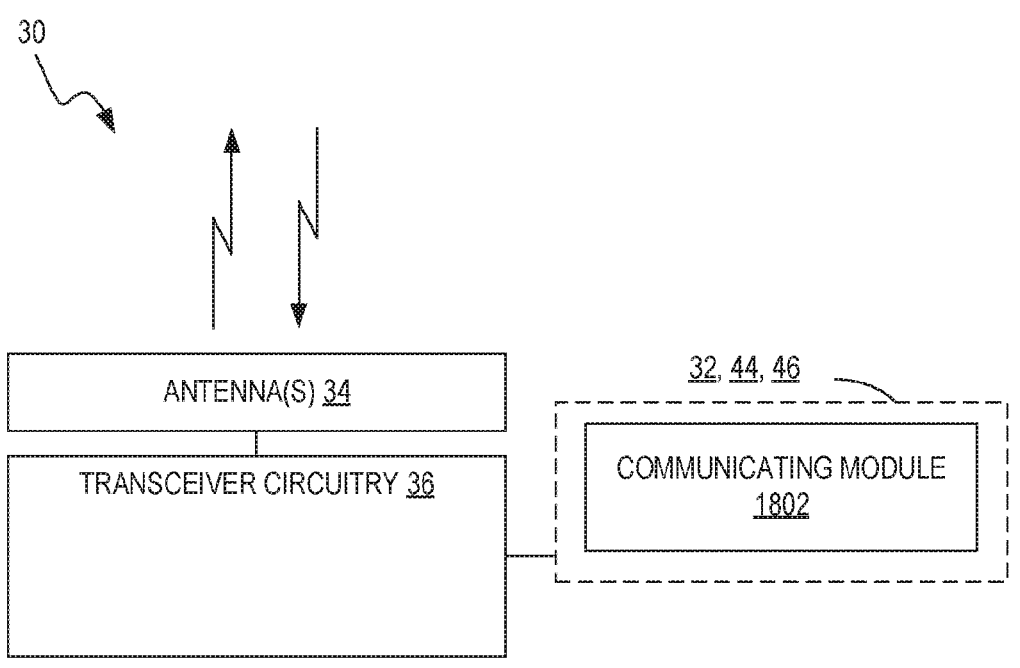
FIG. 18 is a block diagram illustrating a functional implementation of a network node, according to some embodiments.

FIG. 18 illustrates an example functional module or circuit architecture for a network node, such as network node 30. The functional implementation includes a communicating module 1802 for transmitting using a first carrier having a predetermined number of subcarriers within the bandwidth of a second carrier, such that data for one or more of the predetermined number of subcarriers corresponding to a partial overlap by the first carrier of a resource block of the second carrier is not transmitted.

Figure 19:
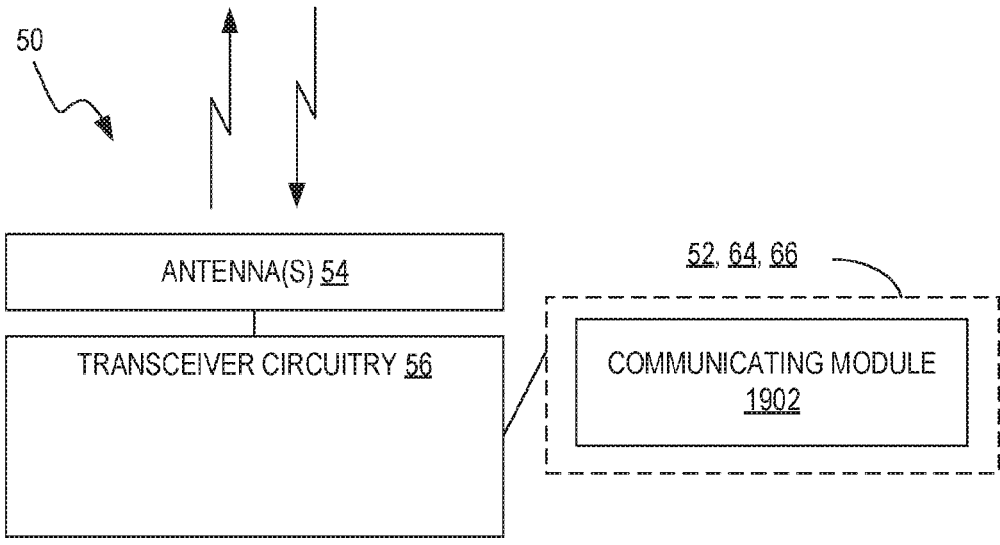
FIG. 19 is a block diagram illustrating a functional implementation of a wireless device, according to some embodiments.

FIG. 19 illustrates an example functional module or circuit architecture for wireless device 50 that includes a communicating module 1902 for receiving using a first carrier having a predetermined number of subcarriers within the bandwidth of a second carrier, such that one or more of the predetermined number of subcarriers corresponding to a partial overlap by the first carrier of a resource block of the second carrier are discarded when decoding the received signal.

EXAMPLE EMBODIMENTS

Example embodiments can include, but are not limited to, the following enumerated examples:

1. A method for communicating in a wireless communication network, comprising:

transmitting using a first carrier having a predetermined number of subcarriers within the bandwidth of a second carrier, such that data for one or more of the predetermined number of subcarriers corresponding to a partial overlap by the first carrier of a resource block of the second carrier is not transmitted.

2. A method for communicating in a wireless communication network, comprising:

receiving using a first carrier having a predetermined number of subcarriers within the bandwidth of a second carrier, such that one or more of the predetermined number of subcarriers corresponding to a partial overlap by the first carrier of a resource block of the second carrier are discarded when decoding the received signal.

3. The method of example embodiment 1 or 2, wherein the partial overlap by the first carrier of the resource block of the second carrier occurs at an outmost resource block of the first carrier.

4. The method of example embodiment 1 or 2, wherein the partial overlap by the first carrier of the resource block of the second carrier occurs at an end resource block of a proper subset of resource blocks of the first carrier.

5. The method of example embodiment 1 or 2, wherein resource blocks of the first carrier are scheduled so as to limit the impact of any of the one or more predetermined subcarriers that are not decoded or do not have its data transmitted.

6. The method of example embodiment 1 or 2, wherein resource blocks of the first carrier are scheduled in first carrier narrowbands that are below a direct current (DC) subcarrier of the first carrier.

7. The method of example embodiment 1 or 2, wherein the first carrier is positioned within the second carrier so that only one subcarrier corresponds to the partial overlap and is not decoded or does not have its data transmitted.

8. The method of example embodiment 1 or 2, wherein the first carrier is positioned within the second carrier so that only two subcarriers of the first carrier correspond to the partial overlap and are not decoded or do not have its data transmitted.

9. The method of any of example embodiments 1-8, wherein the first carrier is a Long Term Evolution—Machine Type Communication (LTE-M) carrier and the second carrier is a New Radio (NR) carrier.

10. The method of example embodiment 9, wherein the center of the LTE-M carrier is positioned within the NR carrier based on:

$$F_{nr,raster} = F_{lte,raster} + 300q, \text{ [kHz], for } q = 3n,$$

wherein n is an integer, $F_{nr,raster}$ is the NR channel raster frequency, $F_{lte,raster}$ is the LTE channel raster frequency, and q is an integer that must be chosen based on the NR frequency range and the location of the LTE-M carrier.

11. The method of example embodiment 9 or 10, wherein resource blocks of the LTE-M carrier are scheduled within any of the following LTE-M narrowbands:

| LTE and NR system bandwidth | Index of LTE PRBs (starting from 0) used for a narrowband |
|---|---|
| 5 MHz | (0-5), (6-11) |
| 10 MHz | (1-6), (7-12), (13-18), (19-24) |
| 15 MHz | (1-6), (7-12), (13-18), (19-24), (25-30), (31-36) |
| 20 MHz | (2-7), (8-13), (14-19), (20-25), (26-31), (32-37), (38-43), (44-49) |

12. The method of example embodiment 9, wherein the one or more LTE-M subcarriers that are not used for LTE-M transmission or reception are limited to the ones of the LTE-M subcarriers that are associated with MTC physical downlink control channel (MPDCCH) resource blocks.

13. The method of example embodiment 9, wherein the one or more LTE-M subcarriers that are not used for LTE-M transmission or reception are limited to LTE-M subcarriers associated with physical downlink shared channel (PDSCH) resource blocks.

14. The method of example embodiment 9, wherein resource blocks of the LTE-M carrier below a direct current (DC) subcarrier of the LTE-M carrier are aligned with NR resource blocks.

15. The method of example embodiment 1 or 2, wherein the transmitting or receiving is subject to aligning subcarriers in LTE-M and NR on the same grid and subject to raster placement.

16. The method of any of example embodiments 1-15, further comprising sending or receiving information about subcarriers that correspond to the partial overlap and/or that are not decoded or do not have their data transmitted.

17. The method of any of example embodiments 1-16, wherein the radio access technology (RAT) of the first carrier is different than the RAT of the second carrier.

18. The method of any of example embodiments 1-16, wherein the first and second carriers belong to the same radio access technology but use different configurations or modes resulting in overlapping subcarriers.

19. A network node adapted to perform the methods of any of example embodiments 1-18.

20. A network node comprising transceiver circuitry and processing circuitry operatively associated with the transceiver circuitry and configured to perform the methods of any of example embodiments 1-18.

21. A wireless device adapted to perform the methods of any of example embodiments 1-18.

22. A wireless device comprising transceiver circuitry and processing circuitry operatively associated with the transceiver circuitry and configured to perform the methods of any of example embodiments 1-18.

23. A computer program comprising instructions that, when executed on at least one processing circuit, cause the at least one processing circuit to carry out the method according to any one of example embodiments 1-18.

24. A carrier containing the computer program of example embodiment 23, wherein the carrier is one of an electronic signal, optical signal, radio signal, or computer readable storage medium.

A1. A communication system including a host computer comprising:
    processing circuitry configured to provide user data; and
    a communication interface configured to forward the user data to a cellular network for transmission to a user equipment (UE), wherein the cellular network comprises a base station having a radio interface and processing circuitry, the base station's processing circuitry configured to perform any of the operations comprising embodiments 14-17.

A2. The communication system of the previous embodiment further including the base station.

A3. The communication system of the previous two embodiments, further including the UE, wherein the UE is configured to communicate with the base station.

A4. The communication system of the previous three embodiments, wherein:
    the processing circuitry of the host computer is configured to execute a host application, thereby providing the user data; and
    the UE comprises processing circuitry configured to execute a client application associated with the host application.

A5. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of embodiments 14-17.

A6. The method of the previous embodiment, further comprising, at the base station, transmitting the user data.

A7. The method of the previous 2 embodiments, wherein the user data is provided at the host computer by executing a host application, the method further comprising, at the UE, executing a client application associated with the host application.

A8. A user equipment (UE) configured to communicate with a base station, the UE comprising a radio interface and processing circuitry configured to perform any of the previous 3 embodiments.

A9. A communication system including a host computer comprising:
    processing circuitry configured to provide user data; and
    a communication interface configured to forward user data to a cellular network for transmission to a user equipment (UE), wherein the UE comprises a radio interface and processing circuitry, the UE's components configured to perform any of the steps of any of embodiments 1-13.

A10. The communication system of the previous embodiment, wherein the cellular network further includes a base station configured to communicate with the UE.

A11. The communication system of the previous 2 embodiments, wherein:
    the processing circuitry of the host computer is configured to execute a host application, thereby providing the user data; and the UE's processing circuitry is configured to execute a client application associated with the host application.

A12. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of embodiments 1-13.

A13. The method of the previous embodiment, further comprising at the UE, receiving the user data from the base station.

A14. A communication system including a host computer comprising:
    communication interface configured to receive user data originating from a transmission from a user equipment (UE) to a base station, wherein the UE comprises a radio interface and processing circuitry, the UE's processing circuitry configured to perform any of the steps of any of embodiments 1-13.

A15. The communication system of the previous embodiment, further including the UE.

A16. The communication system of the previous 2 embodiments, further including the base station, wherein the base station comprises a radio interface configured to communicate with the UE and a communication interface configured to forward to the host computer the user data carried by a transmission from the UE to the base station.

A17. The communication system of the previous 3 embodiments, wherein:
    the processing circuitry of the host computer is configured to execute a host application; and
    the UE's processing circuitry is configured to execute a client application associated with the host application, thereby providing the user data.

A18. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.

A19. A method implemented in a communication system including a host computer, a base station and a user equipment (UE), the method comprising: at the host computer, receiving user data transmitted to the base station from the UE, wherein the UE performs any of the steps of any of embodiments 1-13.

A20. The method of the previous embodiment, further comprising, at the UE, providing the user data to the base station.

A21. The method of the previous 2 embodiments, further comprising:

at the UE, executing a client application, thereby providing the user data to be transmitted; and at the host computer, executing a host application associated with the client application.

A22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

A23. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 14-17.

A24. The communication system of the previous embodiment further including the base station.

A25. The communication system of the previous two embodiments, further including the UE, wherein the UE is configured to communicate with the base station.

A26. The communication system of the previous three embodiments, wherein:

the processing circuitry of the host computer is configured to execute a host application; and the UE is further configured to execute a client application associated with the host application, thereby providing the user data to be received by the host computer.

A27. A method implemented in a communication system including a host computer, a base station and a user equipment (UE), the method comprising:

at the host computer, receiving, from the base station, user data originating from a transmission which the base station has received from the UE, wherein the base station performs any of the steps of any of embodiments 14-17.

A28. The method of the previous embodiment, further comprising at the base station, receiving the user data from the UE.

A29. The method of the previous 2 embodiments, further comprising at the base station, initiating a transmission of the received user data to the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method for communicating in a wireless communication network, comprising:

scheduling resource blocks of a first carrier in first carrier narrowbands that are below a direct current (DC) subcarrier of the first carrier, the first carrier having a predetermined number of subcarriers within bandwidth of a second carrier and wherein a first subset of the scheduled resource blocks of the first carrier below the DC subcarrier are aligned with resources blocks of the second carrier and a second subset of the scheduled resource blocks of the first carrier below the DC subcarrier are not aligned with resource blocks of the second carrier; and transmitting a signal using the first carrier, wherein the transmitting is performed such that data for each of the predetermined number of subcarriers that corresponds to a partial overlap by the first carrier of a resource block of the second carrier is not transmitted, the first carrier being an LTE-M carrier and the second carrier being a NR carrier.

2. The method of claim 1, wherein the partial overlap by the first carrier of the resource block of the second carrier occurs at an outmost resource block of the first carrier.

3. The method of claim 1, wherein the resource blocks of the first carrier are scheduled to limit impact of any of the one or more predetermined subcarriers that are not decoded or do not have its data transmitted.

4. The method of claim 1, wherein the method comprises positioning the first carrier within the second carrier so that only one subcarrier corresponds to the partial overlap and is not transmitted.

5. The method of claim 1, wherein the method comprises positioning the first carrier within the second carrier so that only two subcarriers of the first carrier correspond to the partial overlap and do not have their data transmitted.

6. The method of claim 1, wherein the first carrier is a Long Term Evolution-Machine Type Communication (LTE-M) carrier and the second carrier is a New Radio (NR) carrier.

7. The method of claim 6, wherein the method comprises positioning the center of the LTE-M carrier within the NR carrier based on:

$$F_{nr,raster} = F_{lte,raster} + 300q, \text{ [kHz], for } q=3n,$$

wherein n is an integer, $F_{nr,raster}$ is the NR channel raster frequency, $F_{lte,raster}$ is the LTE channel raster frequency, and q is an integer chosen based on the NR frequency range and the location of the LTE-M carrier.

8. The method of claim 6, wherein the method comprises scheduling resource blocks of the LTE-M carrier within any of the following LTE-M narrowbands: LTE and NR system bandwidth Index of LTE PRBs (starting from 0) used for a narrowband:

| LTE and NR system bandwidth | Index of LTE PRBs (starting from 0) used for a narrowband |
| --- | --- |
| 5 MHz | (0-5), (6-11) |
| 10 MHz | (1-6), (7-12), (13-18), (19-24) |
| 15 MHz | (1-6), (7-12), (13-18), (19-24), (25-30), (31-36) |

-continued

| LTE and NR system bandwidth | Index of LTE PRBs (starting from 0) used for a narrowband |
|---|---|
| 20 MHz | (2-7), (8-13), (14-19), (20-25), (26-31), (32-37), (38-43), (44-49). |

9. The method of claim 6, wherein the method comprises limiting the one or more LTE-M subcarriers that are not used for LTE-M transmission to LTE-M subcarriers associated with physical downlink shared channel (PDSCH) resource blocks.

10. A method for communicating in a wireless communication network, comprising:

receiving a signal carried by a first carrier having a predetermined number of subcarriers within bandwidth of a second carrier, wherein the receiving comprises discarding each of the predetermined number of subcarriers that corresponds to a partial overlap by the first carrier of a resource block of the second carrier when decoding the received signal, wherein resource blocks of the first carrier in first carrier narrowbands are scheduled below a direct current (DC) subcarrier of the first carrier such that a first subset of the scheduled resource blocks of the first carrier below the DC subcarrier are aligned with resources blocks of the second carrier and a second subset of the scheduled resource blocks of the first carrier below the DC subcarrier are not aligned with resource blocks of the second carrier.

11. The method of claim 10, wherein the partial overlap by the first carrier of the resource block of the second carrier occurs at an outmost resource block of the first carrier.

12. The method of claim 10, wherein resource blocks of the first carrier are scheduled so as to limit the impact of any of the one or more predetermined subcarriers that are not decoded or do not have its data transmitted.

13. The method of claim 10, wherein the method comprises positioning the first carrier within the second carrier so that only one subcarrier corresponds to the partial overlap and is not decoded.

14. The method of claim 10, wherein the method comprises positioning the first carrier within the second carrier so that only two subcarriers of the first carrier correspond to the partial overlap and are not decoded.

15. The method of claim 10, wherein the first carrier is a Long Term Evolution-Machine Type Communication (LTE-M) carrier and the second carrier is a New Radio (NR) carrier.

16. The method of claim 15, wherein the method comprises positioning the center of the LTE-M carrier within the NR carrier based on:

$$F_{nr,raster} = F_{lte,raster} + 300q, \text{ [kHz], for } q=3n,$$

wherein n is an integer, $F_{nr,raster}$ is the NR channel raster frequency, $F_{lte,raster}$ is the LTE channel raster frequency, and q is an integer chosen based on the NR frequency range and the location of the LTE-M carrier.

17. The method of claim 15, wherein the method comprises limiting the one or more LTE-M subcarriers that are not used for LTE-M reception to the ones of the LTE-M subcarriers that are associated with MTC physical downlink control channel (MPDCCH) resource blocks.

18. The method of claim 10, wherein the receiving is subject to aligning subcarriers in LTE-M and NR on the same grid and subject to raster placement.

19. The method of claim 10, further comprising receiving information about subcarriers that correspond to the partial overlap and that are not to be decoded.

20. The method of claim 10, wherein a radio access technology, RAT, of the first carrier is different than a RAT of the second carrier.

21. The method of claim 10, wherein the first and second carriers belong to the same radio access technology but use different configurations or modes resulting in overlapping subcarriers.

22. A network node comprising:

transceiver circuitry and processing circuitry operatively associated with the transceiver circuitry and configured to perform operations comprising:

scheduling resource blocks of a first carrier in first carrier narrowbands that are below a direct current (DC) subcarrier of the first carrier, the first carrier having a predetermined number of subcarriers within bandwidth of a second carrier and wherein a first subset of the scheduled resource blocks of the first carrier below the DC subcarrier are aligned with resources blocks of the second carrier and a second subset of the scheduled resource blocks of the first carrier below the DC subcarrier are not aligned with resource blocks of the second carrier; and transmitting a signal using the first carrier, wherein the transmitting is performed such that data for each of the predetermined number of subcarriers that corresponds to a partial overlap by the first carrier of a resource block of the second carrier is not transmitted.

23. A wireless device comprising:

transceiver circuitry and processing circuitry operatively associated with the transceiver circuitry and configured to perform operations comprising:

receiving a signal carried by a first carrier having a predetermined number of subcarriers within bandwidth of a second carrier, wherein the receiving comprises discarding each of the predetermined number of subcarriers that corresponds to a partial overlap by the first carrier of a resource block of the second carrier when decoding the received signal, wherein resource blocks of the first carrier in first carrier narrowbands are scheduled below a direct current (DC) subcarrier of the first carrier such that a first subset of the scheduled resource blocks of the first carrier below the DC subcarrier are aligned with resources blocks of the second carrier and a second subset of the scheduled resource blocks of the first carrier below the DC subcarrier are not aligned with resource blocks of the second carrier.

* * * * *